(12) United States Patent
Hussain et al.

(10) Patent No.: US 11,032,213 B1
(45) Date of Patent: Jun. 8, 2021

(54) CENTRALIZED MANAGEMENT OF COMPUTING RESOURCES ACROSS SERVICE PROVIDER NETWORKS

(71) Applicant: Amazon Technologies, Inc., Seattle, WA (US)

(72) Inventors: Amjad Hussain, Bellevue, WA (US); Diwakar Chakravarthy, Kirkland, WA (US); Ryan John Lohan, Seattle, WA (US); Bharath Swaminathan, Issaquah, WA (US); Anil Kumar, Seattle, WA (US); Sami Azzam, Bothell, WA (US); Sayali Suhas Deshpande, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 16/220,682

(22) Filed: Dec. 14, 2018

(51) Int. Cl.
| | |
|---|---|
| *H04L 12/927* | (2013.01) |
| *H04L 12/911* | (2013.01) |
| *H04L 29/08* | (2006.01) |
| *G06F 9/455* | (2018.01) |
| *G06F 9/54* | (2006.01) |

(52) U.S. Cl.
CPC ........ *H04L 47/805* (2013.01); *G06F 9/45558* (2013.01); *H04L 47/782* (2013.01); *H04L 47/783* (2013.01); *H04L 47/821* (2013.01); *H04L 67/1012* (2013.01); *H04L 67/306* (2013.01); *G06F 9/541* (2013.01); *G06F 2009/45595* (2013.01)

(58) Field of Classification Search
CPC . H04L 47/783; H04L 67/1012; H04L 67/306; H04L 47/782; G06F 9/45558
USPC .......................................................... 709/226
See application file for complete search history.

(56) References Cited

U.S. PATENT DOCUMENTS

| | | | |
|---|---|---|---|
| 10,333,784 B2* | 6/2019 | Liu ...................... | H04L 41/0843 |
| 2011/0022694 A1* | 1/2011 | Dalal ................... | H04L 41/0856 |
| | | | 709/222 |
| 2012/0072597 A1* | 3/2012 | Teather ................. | G06F 9/5072 |
| | | | 709/226 |
| 2013/0238805 A1* | 9/2013 | Catrein ................... | H04L 47/70 |
| | | | 709/226 |

(Continued)

Primary Examiner — John M MacIlwinen
(74) Attorney, Agent, or Firm — Lee & Hayes, P.C.

(57) ABSTRACT

This disclosure describes techniques for centralizing the management of computing resources that are provisioned across multiple service provider networks by infrastructure modeling services. A service provider network may host or provide a centralized management service that supports an open source framework that provides users, or developers, with a unified development interface to manage computing resources that are provisioned in different service provider networks. The unified development interface of the host service provider network may provide users with a meta schema or language format to create infrastructure schemas for modeling, provisioning, and operating computing resources across service provider networks that are managed by different service providers. Additionally, the host service provider network may provide an open provider registry where developers of infrastructure schemas may store and publish infrastructure schemas for the different service provider networks to share computing resource types with other developers or users of cloud-based services.

20 Claims, 15 Drawing Sheets

(56) References Cited

U.S. PATENT DOCUMENTS

| | | | |
|---|---|---|---|
| 2014/0196028 A1* | 7/2014 | Macpherson | G06F 9/45558 718/1 |
| 2017/0041189 A1* | 2/2017 | Aswathanarayana | H04L 41/0843 |
| 2017/0076101 A1* | 3/2017 | Kochhar | G06F 21/6209 |
| 2017/0124617 A1* | 5/2017 | Spoelstra | G06Q 30/0621 |
| 2017/0207968 A1* | 7/2017 | Eicken | H04L 67/20 |
| 2018/0046482 A1* | 2/2018 | Karve | G06F 9/45558 |
| 2019/0227780 A1* | 7/2019 | Keyser | G06F 9/547 |
| 2020/0059420 A1* | 2/2020 | Abraham | H04L 41/5054 |
| 2020/0136930 A1* | 4/2020 | Szulman | G06F 9/5077 |

\* cited by examiner

FIG. 2A

DEVELOPER INTERFACE 200

Computing Resource Management https://www.console.serviceproviderABC.com/ResourceManagement

RESOURCE MANAGEMENT CONSOLE 202

[Create Stack ▼] [Actions ▼] [Use Resource Type] [Create Resource Type]

| Logical ID | Service Provider Network | Type | Status | Description |
|---|---|---|---|---|
| ☐ Server | Service Provider Network ABC | Compute | Create_Complete | Provides compute for .... |
| ☑ Queue | Service Provider Network DEF | Queue | Create_InProgress | Alert message Queue |

[Overview] [Outputs] [Resources] [Events] [Resource Type] [Parameters] [Tags] [Stack Policy]

Choose template language: ⦿JSON ○YAML ....

```
1  "service_ID": "service.queue.v1.json"
2  "typeName": "Service;Queue"
3  "service_Provider": "Service_Provider_2.address"
4  "properties": {
5    "MaximumMessageSize": {
6      "type": "integer",
7      "description": "The maximum allowed message size"
8      "default": 262122,
9      "minimum": 1024,
10     "maximum": 262144,
11   ...
```

RESOURCE TYPE LIST 204

RESOURCE TYPE INTERFACE 206

CENTRALIZED MANAGEMENT OF COMPUTING RESOURCES ACROSS SERVICE PROVIDER NETWORKS

BACKGROUND

Service provider networks offer network-based services to fulfill users' computing-service needs without the users having to invest in and maintain computing infrastructure required to implement the services. For example, service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, data storage resources, database resources, networking resources, network services, and other types of computing resources. Users may configure the computing resources provided by a service provider network to implement desired functionality, such as to provide a network-based application or another type of functionality.

Due to the wide variety of computing-service needs of users, many different cloud-based service providers have emerged that manage respective service provider networks user to provide different cloud-based services. Thus, a single user may subscribe for use of services from multiple service providers, and have computing resources provisioned and managed in multiple service provider networks. However, managing resources and services across different service providers may result in various inefficiencies and complexities experienced by users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-2C illustrate example developer interfaces, such as a graphical user interfaces (GUI), for receiving input to define resource types, and allowing users to search for resource types published in a registry.

DETAILED DESCRIPTION

Figure 1:
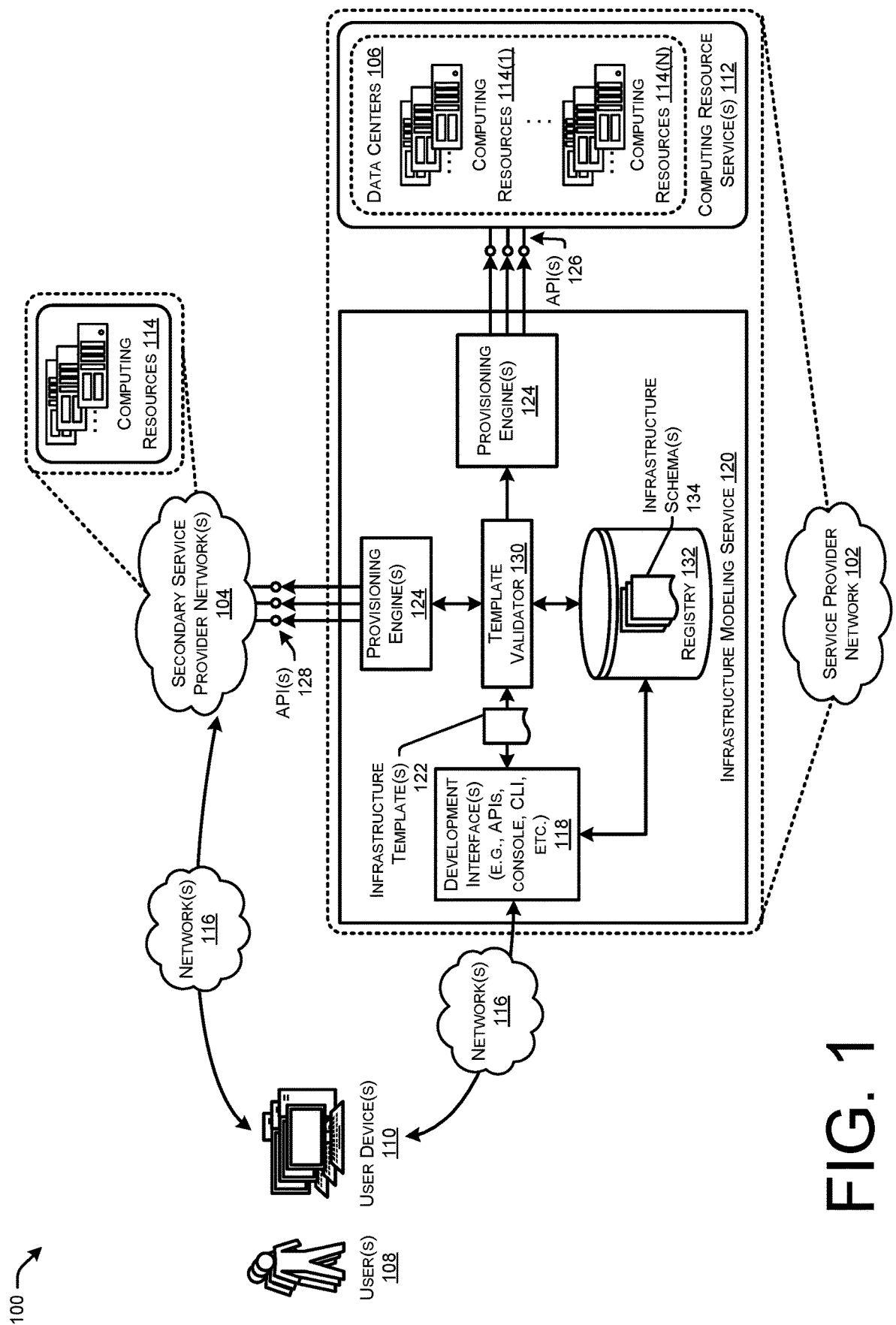
FIG. 1 illustrates a system-architecture diagram of an example environment in which a service provider network provides a centralized management service that allows users or developers to manage computing resources across multiple service provider networks using infrastructure modeling services.

This disclosure describes, at least in part, techniques for centralizing the management of computing resources that are provisioned across multiple service provider networks using infrastructure modeling services. A service provider network may host, or provide, a centralized management service that provides an open source framework that allows users, or developers, to use a unified development interface or console to manage computing resources and services that are provisioned in different service provider networks of different service providers. For example, the host service provider network may allow users to utilize the unified development interface to model, provision, and operate computing resources that are provided by the host service provider network itself, as well as other service provider networks that are managed by different service providers.

Users may utilize the unified development interface to describe computing resources and/or computing resource stacks in a text file or other type of descriptive representation (herein generally referred to as infrastructure templates). For instance, users may utilize a single console, software development kit, and/or other development interface provided by the host service provider network in order to create or define the infrastructure templates. Generally, the infrastructure templates can describe the shapes of computing resources for different types of resources, and for different service provider networks. For example, the infrastructure templates may be written in a human-readable language, and machine-readable language, such as JSON, XML, YAML, and so forth. The infrastructure modeling service may create and configure computing resources that are described in the infrastructure templates using one or more computing resource services provided by the service provider networks (e.g., storage service, compute service, database service, etc.). In some examples, the infrastructure service may be configured to determine, based on the text in the infrastructure template that defines the shape of the computing resources, one or more API calls to make to computing resource services provided by the service provider networks to cause computing resources to be provisioned.

In some examples, service providers that manage service provider networks may offer infrastructure modeling services that provision computing resources on behalf of users. For instance, infrastructure modeling services may provision computing resources defined in an infrastructure template by creating and configuring the resources using one or more computing resource services provided by the service provider network (for example, a hardware virtualization service to create compute instances, a database virtualization service to create database instances, and so forth). The use of infrastructure modeling services enables users to provision computing resource stacks in an automated and repeatable manner, relieving users from performing many manual actions or writing custom scripts to provision computing resource stacks in an automated fashion.

While infrastructure modeling services may be available for different service provider networks to allow users to model, provision, and operate computing resources in the service provider networks, users that have increased their cloud-based resource footprint to span across multiple service provider networks have to be familiar with different provisioning/modeling tools. However, using multiple infrastructure modeling services or tools for performing the same types of tasks (model, provision, and operate cloud services) across different service provider networks may lead to document clutter, tool sprawl, automation silos that increase the complexity revolving around the use of different automated provisioning tools, and/or other inefficiencies.

According to the techniques described herein, the infrastructure modeling service of the host service provider network may additionally create and configure computing resources in other service provider networks managed by other service providers (referred to herein as "secondary service provider networks"). For example, a user that defines an infrastructure template may indicate which service provider network in which the infrastructure template defines a computing resource to be provisioned. The host's infrastructure modeling service may utilize the infrastructure templates and cause a computing resource to be provisioned in one or more secondary service provider networks, such as by sending code to the secondary service provider networks, calling APIs of the secondary service provider networks, and/or any other means.

As noted above, a host service provider network (or other computing platform) may provide a centralized management service that supports an open source framework that allows users, or developers, to use a unified development interface to manage computing resources and services for multiple service provider networks. In some examples, users may create infrastructure schemas using the unified development interface to model different resource types for any of the different service provider networks. For example, the unified development interface may allow users to write, or otherwise create, the infrastructure schemas in a unified meta schema or language format. The meta schema or language format used to create infrastructure schemas may be a text-based description of a computing resource stack that is machine-readable and also human-readable. The meta schema may be a language that is uniquely created or managed by the host service provider network, or a known language format such as JSON, YAML, XML, plain text, and/or other computer-readable and human-readable languages. However, it may be difficult for users to create valid, and usable infrastructure schemas from scratch, and/or by viewing sample infrastructure schemas.

In some examples, the techniques further include defining infrastructure schemas for different resource types, such as new resource types, provided by the host service provider network and/or secondary service provider networks. For example, the unified development interface may provide users with structured schemas, or "meta schemas," to create define infrastructure templates using a structure/predefined format or syntax, but that are usable to provision and operate computing resources across a variety of different service provider networks. Further, the infrastructure schemas may be published or stored in an open provider registry, or an accessible repository, such that other users may access and share infrastructure schemas defining different resource types.

For example, developers of the host service provider network, developers of the secondary service provider network, and/or public domain developers, may create meta schemas that restrict and control how a user defines the shape of a computing resource such that a user who wishes to create an infrastructure template using an infrastructure schema may provide inputs that are compliant with the infrastructure schema. As an example, a developer may create a JSON schema for provisioning a database instance in a secondary service provider network. The JSON schema may define parameters that restrict and control what inputs a user can provide for parameters of the database instance. For instance, the JSON schema may include read-only fields that contain parameters or definitions that are necessary to properly implement the database instance in the secondary service provider network (e.g., API call(s), memory locations, etc.). However, the JSON schema may include write fields in which users may provide user-definable parameters for their desired infrastructure template. For instance, the user may be allowed to input a name of the database instance, a size (e.g., rows and columns) for the database instance, an amount of compute power allocated for the database instance, an amount of memory to allocate for the database instance, and so forth.

Accordingly, if a user desires to create a particular infrastructure template, the user may indicate the type of resource and/or service provider network for which they would like to create the infrastructure template, and receive a sample schema, or infrastructure schema, for that resource type and/or service provider network. Additionally, the infrastructure schema may restrict or control the types of inputs the user provides as parameters to help ensure that the resulting code that is generated from the infrastructure schema is compliant for that resource type and/or service provider network. In some examples, the development interface that provides the infrastructure schemas may allow for testing and/or debugging of the code that is created using the infrastructure schemas. For instance, the development interface may provide errors that indicate improper parameters for the resource type and/or service provider network for which the resulting infrastructure template is to be used for provisioning the computing resource. Once the user has created a valid infrastructure template using the infrastructure schema, the development interface may generate the final code, and the infrastructure modeling service may provision the computing resource described in the infrastructure template in the selected host service provider network or the appropriate secondary service provider network.

In some examples, the unified development interface may comprise an open-source toolkit (or other interface(s) such as a CLI, API, etc.) that allows users to create and test computing resource types for different service provider networks using a common language format. Upon receiving a request from a user to initialize a workspace to create an infrastructure schema for a computing resource type, the development interface may request that the user provide input that indicates which of the supported service provider networks for which the user is creating an infrastructure schema, and also indicates a type of the computing resource that the user is creating (e.g., compute resource, data/storage resource, network-related resource, application resource, etc.). The development interface may allow the user to start creating a text file (or infrastructure schema) that describes the properties and shape of the described resource.

As noted above, the development interface may provide structured infrastructure schemas based on the desired resource type and/or service provider network. The infrastructure schemas may be compliant with the meta schema and illustrate different ways the user may define the resource type. In some examples, the infrastructure schemas may include definable fields the user can write into to define and/or customers parameters or properties of the cloud resource. Additionally, or alternatively, the sample template may include read-only fields or portions that are specific or required to provision the desired resource and/or for the indicates service provider network. For example, if a user is creating an infrastructure template for a database resource type, the sample template may include user-definable fields where the user can specify parameters of the database resource, such as a name of the database, how much memory is reserved for the database resource/instance, an amount of compute or processing power, and/or other parameters. The read-only fields may include information such as API calls for provisioning the database resource in a particular service provider network, parameters for properly defining the database resource in memory, and so forth. In this way, a user may create an infrastructure template using a common meta schema language for different resource types and/or for different service provider networks.

Once the user has finished creating the infrastructure template, the user may request that the development interface generate source code based on the description in infrastructure template for review and/or testing. For instance, the infrastructure template may be validated against an infrastructure schema for the desired computing resource. The development interface (or another service managed by the host service provider network) may generate source code for the final infrastructure template, or otherwise generate source code according to the filled-out infrastructure schema. Generally, the infrastructure template may be used to generate source code that is appropriate for, or used by, the desired service provider network. For instance, the different service provider networks may provision computing resources using different types of source code or other computer-readable instructions. In such examples, the infrastructure schema may be utilized to generate the code in a format that is utilized by the desired service provider network. Further, the user may edit the source code, if desired, to fix bugs and/or include source code that is known to the user and/or wanted by the user to be included for their computing resource instance. Additionally, the development interface may provide various tests to ensure that the code is built to conform to the consistent interface, and for debugging purposes by the user. The user can modify the infrastructure template and/or code based on the testing until the infrastructure template is ready for use in provisioning the particular computing resource type.

After creating an infrastructure template for a computing resource, the user can then request that the host service provider network utilize the infrastructure template to provision a computing resource in their network using the infrastructure modeling service. In other examples, the user may request that the host service provider network cause the computing resource to be provisioned in a secondary service provider network for which the infrastructure template was created. For instance, the infrastructure modeling service of the host service provider network may be configured to provision the computing resource directly in a secondary service provider network, such as if the secondary service provider has given permission to the host service provider to do so. In some examples, the host service provider network may generate the code using the infrastructure schema, and provide the code to the secondary service provider to be utilized by the respective secondary infrastructure modeling service to provision the computing resource in the secondary service provider network.

In various examples, the host service provider network may further provide and/or manage a provider registry, such as an accessible repository, in which users can store and/or publish their infrastructure schemas. The registry may be an open, public registry that developers of infrastructure schemas can use to store, publish, discover, and centrally manage infrastructure schemas for different computing resource types, and for different service provider networks. The infrastructure schemas may be stored in the registry in groupings with other infrastructure schemas based on particular service provider networks and/or resource types for which the infrastructure schemas were created. In some examples, the developers or users may mark or flag an infrastructure schema as public, such that other users may access and utilize the infrastructure schema, or private such that other users cannot access or use the infrastructure schema. The repository that maintains the template registry may further store additional information along with the infrastructure schemas, such as documentation, code samples, and/or other metadata (e.g., version number, dependencies, etc.) for the resource type.

In this way, developers of infrastructure schemas may create an open-source library of infrastructure schemas that are created or written in a common, unified meta schema or language format. However, rather than being specific to a particular service provider network, the infrastructure schemas may be defined according to parameters specific to different service provider networks that are supported by the centralized management service of the host service provider network.

The techniques described herein recite various improvements to infrastructure modeling services provided by service provider networks. Infrastructure modeling services may be available for different service provider networks to allow users to model, provision, and operate computing resources in the service provider networks. However, as users continue to span their cloud-based resource footprint across different service provider networks managed by different service providers, the users may have to be familiar with different provisioning/modeling tools. However, using multiple infrastructure modeling services or tools for performing the same types of tasks (model, provision, and/or operate cloud services) across different service provider networks may lead to document clutter, tool sprawl, automation silos that increase the complexity revolving around the use of different automated provisioning tools, and/or other inefficiencies. The centralized management service described herein may provide a centralized, unified, stand-alone interface or means to operate across the different service provider networks. For instance, using the centralized development interface described herein, users need only learn or be familiar with unified meta schema or language format to define infrastructure templates for provisioning resources across various service provider networks. Additionally, much of the code needed to implement a computing resource may be provided by the infrastructure schemas, potentially along with annotations to help users understand what input parameters they are to provide into the infrastructure schemas to define their infrastructure templates. Using the centralized management service described herein, users are not limited to using fixed definitions of provider-specific resource types that are exposed by different provisioning tools or services. Instead, users are provided flexibility in modeling resource definitions to create abstractions for implementing complex and sophisticated architectures in a unified and intuitive way.

In addition to the tooling provided to develop and test new resource types across different service provider networks, the centralized management service may further provide an open provider registry to allow developers of infrastructure schemas to store, publish, discover, share, and centrally manage infrastructure schemas for different computing resource types, and for different service provider networks. In this way, the techniques described herein may provide an open source framework for creating and provisioning computing resources across different service provider networks, thereby improving the efficiency, as well as scalability, of managing computing resources across service provider networks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 provides a centralized management service that allows users or developers to manage computing resources across multiple service provider networks using infrastructure modeling services.

In some examples, the service provider network 102, as well as one or more secondary service provider networks 104, may comprise clusters of managed servers stored in data centers 106 located across geographic areas. The service provider network 102 may be a distributed network through which users 108 (often customers) may interact via user devices 110 to utilize one or more computing resource services 112 supported by various computing resources 114(1)-114(N) on a permanent or as-needed basis. For instance, the computing resources 114 may be hardware, firmware, software, and/or any other type of resources 114 that are supported by data centers 106, such as compute resources 114 (for example, executing virtual machine (VM) instances and/or containers, executing batch jobs, executing code without provisioning servers), data/storage resources 114 (for example, object storage, block-level storage, data archival storage), network-related resources 114 (for example, configuring virtual networks including groups of compute resources, content delivery networks (CDNs), Domain Name Service (DNS)), application resources 114 (for example, databases, application build/deployment services), and so forth. These and other computing resources 114 may be provided as services 112, such as a hardware virtualization service 114 that can execute server instances, a database virtualization service 112 that can execute database instance, a storage virtualization service 112 that can store data objects, and so forth.

The users 108 (e.g., customers, developers, providers, etc.) of service provider networks 102 and/or 104 may utilize one or more user accounts that are associated with a user and/or developer account, though these terms may be used somewhat interchangeably depending upon the context of use. Users 108 may interact with a service provider network 102/104 across one or more intermediate networks 116 (for example, the internet) via one or more development interface(s) 118, such as through use of application programming interface (API) calls, via a console implemented as a website or application, a software development kit (SDK), one or more command line interfaces (CLIs), and/or another interface 118. The interface(s) 118 may be part of, or serve as a front-end to, a control plane of the service provider network 102 that includes "backend" services supporting and enabling the services 112 that may be more directly offered to customers.

To provide these and other computing resource services 112, service provider networks 102 often rely upon virtualization techniques. For example, virtualization technologies may be used to allow users 108 to control or utilize server instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple server instances can be implemented using a single electronic device. Thus, a user 108 may directly utilize a server instance hosted by the service provider network 102 to perform a variety of computing tasks, or may indirectly utilize a server instance by submitting code to be executed by the service provider network 102/104, which in turn utilizes a server instance to execute the code (typically without the user having any control of or knowledge of the underlying server instance(s) involved).

Depending on the type of service 112, each type or configuration of a computing resource 114 may be available from the service provider network 102 in different sizes. For example, a service provider might offer physical hosts, VM instances or other types of data processing resources that are available for purchase and use that have many different configurations of processor capabilities, main memory, disk storage, and operating system. A service provider operating the service provider network 102 might also offer other types of resources 114 for purchase and use by users 108. For example, a service provider might offer virtual or hardware devices, database resources and instances, file or block data storage resources, and/or networking resources, such as load balancing resources, domain name service ("DNS") resources 114, virtual private cloud ("VPC") resources 114, virtual local area network ("VLAN") resources 114, and/or other types of hardware and software computing resources 114 or services 112 on a permanent or as-needed basis. The resources 114 might also include, but are not limited to, VM instances and images, security groups, option groups, gateways, option sets, network access control lists ("ACLs"), subnets, storage buckets, network interfaces, snapshots, spot market requests, and storage volumes.

The resources described above may be provided in one particular implementation by one or more data centers 106 operated by the service provider. As known to those skilled in the art, data centers 106 are facilities utilized to house and operate computer systems and associated components. Data centers 106 also typically include redundant and backup power, communications, cooling, and security systems. The data centers 106 might be located in geographically disparate regions, and might also be connected to various other facilities, such as co-location facilities, and various wide area networks ("WANs"), such as the Internet.

The resources 114 described briefly above might also be provisioned and de-provisioned as needed in an automated fashion. For example, the service provider network 102 might be configured to instantiate a new instance of a computing resource 114, such as a VM instance, in response to an increase in demand for a network service 112 or other condition. Other types of computing resources 114 might also be provisioned and de-provisioned in a similar manner. Services in the service provider network 102 might also provide functionality for automatically scaling and/or de-scaling resources based upon demand for the resources and/or other factors.

Generally, the secondary service provider networks 104 may comprise the same or similar services 112 and/or computing resources 114 as those provided by the service provider network 102. Additionally, or alternatively, the secondary service provider networks 104 may provide different services 112 and/or computing resources 114 than those provided by the service provider network 102. The secondary service provider networks 104 may be operated by a different organization, company, operator, and/or other entity than the operator of the service provider network 102. Thus, different service providers may manage the service provider network 102 and secondary service provider networks 104.

Generally, the service provider network 102 may provide an infrastructure modeling service 120 that allows users 108 to describe a stack of computing resources 114 in an infrastructure template 122, such as text file or other type of descriptive representation, and provisions the computing resource 114 stacks in the service provider network 102 on behalf of the users 108. For instance, the infrastructure modeling service 120 may include one or more provisioning engines 124 to create and configure the resources 114 using one or more computing resource services 112 provided by the service provider network 102 (for example, a hardware virtualization service to create compute instances, a database virtualization service to create database instances, and so forth). In some examples, the provisioning engines 124 may call one or more APIs 126 that are exposed by the computing resource services 112 in order to provision and configure the desired computing resources 114 that are defined in the infrastructure templates 122. The use of an infrastructure modeling service 120 enables users 108 to provision computing resources 114 in an automated and repeatable manner, relieving users 108 from performing many manual actions or writing custom scripts to provision computing resource stacks in an automated fashion.

Traditionally, users 108 may have created infrastructure templates 122 for the service provider network 102 that are used by the infrastructure modeling service 120 in order to provisioning computing resources 114 in the service provider network 102. However, the development interfaces 118 used to create the infrastructure templates 122 traditionally were specific to the service provider network 102. Thus, while secondary infrastructure modeling services may be available for secondary service provider networks 104 to allow users 108 of multiple service provider networks 102/104 to model, provision, and operate computing resources 114 in the second service provider networks 104, users 108 that have increased their cloud-based resource footprint to span across multiple service provider networks 102/104 have to be familiar with different provisioning/modeling tools. However, using multiple infrastructure modeling services 120 or tools for performing the same types of tasks (model, provision, and operate cloud services) across different service provider networks 102/104 may lead to document clutter, tool sprawl, automation silos that increase the complexity revolving around the use of different automated provisioning tools, and/or other inefficiencies. Accordingly, the techniques described herein include providing a centralized management service that supports an open source framework that allows users, or developers, to use a unified development interface 118 to manage computing resources 114 and services 112 for multiple service provider networks 102/104.

In some examples, a user 108 may define or model an infrastructure schema 134 using the development interfaces 118. For example, the user 108 may write or create an infrastructure schema 134, which may be a text-based document that is machine-readable, and also human readable, such as JSON, YAML, XML, plain text, and/or other computer-readable and human-readable languages. The development interface 118 may comprise any type of interface that allows the user 108 to provide input to define the infrastructure schemas 134. For example, the development interface 118 may be executing entirely on the service provider network 102, and the user 108 may utilize a user device 110 to provide input via a web browser, CLI, and/or other input means. In some examples, the development interface 118 may comprise a development kit that is distributed to the user devices 110 via a software distribution model. Accordingly, at least a portion (or all) of the development interfaces 118 may execute locally on the user devices 110.

To define or create the infrastructure schema 134, the user 108 may request that a workspace be initialized in which the user 108 can create a new schema 134. The user 108 may indicate a desired development language, such as JSON, YAML, CSV, etc., and may also indicate at least one of a desired service provider network 102/104 for which the schema 134 is being created, and/or a desired source code into which the infrastructure schema 134 is to be converted for provisioning of the defined computing resources 114. After completing the infrastructure schema 134, the infrastructure modeling service 120 may provide a template validator 130 to determine where the infrastructure schema 134 is valid or not for the selected service provider network 102/104. The template validator 130 may provide a uniform testing and debugging the infrastructure templates 122 for different service provider networks 102/104.

After completing the infrastructure schemas 134 and/or validating them using the template validator 130, the users 108 may request that the schema 134 be stored in a registry 132. Thus, the infrastructure modeling service 120 may further include the registry 132, which may be stored in a repository managed by, or associated with, the infrastructure modeling service 120. The registry 132 may store infrastructure schemas 134 that define the properties/parameters and shape of computing resources 114 for the service provider networks 102/104. Generally, the infrastructure schemas 134 may define, restrict, or control the inputs received for creating or defining the shape of a computing resource 114. For instance, the infrastructure schemas 134 may be any type of meta schema, such as JSON schema, an XML schema, a GraphQL schema, and/or any other schema that can confine the inputs received from a user to define the infrastructure template 124.

In various examples, each of the infrastructure schemas 134 may be associated with a specific type of resource 114 (e.g., compute resource, storage resource, database resource, VM resource, etc.), and/or a specific service provider network 102/104. Thus, various entities may develop the infrastructure schemas 134 such that read-only fields of the schemas 134 provision the corresponding resource type properly in the networks 102/104, and the write fields restrict the type of input that can be provided by a user, such as requiring text, numerals, numbers within a particular range, and so forth. Developers employed by the service provider network 102 may provide schemas 134 for resources 114 provisioned in the service provider network 102. Developers employed by the secondary service provider networks 104 may provide schemas 134 for resources 114 provisioned in the secondary service provider networks 104. Further, in some examples, independent developers may provide schemas 134 that are verified by the service provider for the respective network 102/104.

Thus, in some examples, when a user 108 requests that a workspace be initiated for creating a schema 134 to define a resource 114, the user 108 may indicate a type of the resource 114 as well as which service provider network 102/104 for which the resource 114 is being defined. The development interface 118 may provide one or more infrastructure schemas 134 for the type of resource 114 and/or the service provider network 102/104. The user 108 may then begin filling out an infrastructure template 122 with the appropriate user input to define an infrastructure template 122 defining configuration data for provisioning the desired computing resource 114 in the desired service provider network 102/104. The user 108 can perform an iterative process using the template validator 130 to ensure their infrastructure template 122 conforms with the schema of the infrastructure schemas 134 for their resource type and/or the service provider network 102/104.

In some examples, the provisioning engine 124 may provision the defined computing resources 114 in the selected service provider network 102/104. In some examples, the provisioning engine 124 may provision the computing resources 114 in the secondary service provider networks 104, such as by calling one or more publicly accessible APIs 128. However, in some examples, the infrastructure modeling service 120 may provide the infrastructure template 122 and/or executable code corresponding to the configuration data in the infrastructure template 122 to a secondary infrastructure modeling service to provision the computing resources 114 in the secondary service provider network 104 on behalf of the user. In this way, the service provider network 102 may provide a unified development interface 118 to allow users 108 to create or define infrastructure schemas 134, and corresponding infrastructure templates 122, for provisioning computing resources 114 in a host service provider network 102, and also in secondary service provider network(s) 104.

Generally, the user devices 110 may be any type of computing device capable of connecting to the service provider network 102 via a suitable data communications network such as, but not limited to, a laptop or desktop computer, a tablet computing device, a server computer, or a mobile telephone. Administrative users 108 employed by the operator of the service provider network 102, such as administrators managing the operation of the service provider network 102, might also connect with, manage, and utilize resources provided by the service provider network 102 in a similar fashion.

FIG. 2 illustrates an example developer interface 200, such as a graphical user interface (GUI), for receiving input that defines an infrastructure schema 134 usable to constrict parameters of an infrastructure template 122 for provisioning a computing resource in a service provider network.

As illustrated, the interface may comprise a developer interface 200, such as an interface supported by or the same as the development interface 118. The developer interface 200 may be a website, console, SDK, and/or any other type of interface at least partly supported by the service provider network 102. The developer interface 200 may enable a user 108 to create an infrastructure schema 134 for defining a computing resource 114 in one or more service provider networks 102 and/or 104.

As illustrated, the developer interface 200 may include a resource list 204 that displays a list of computing resources 114 (e.g., stacks) defined for one or more service provider networks 102/104. The resource list 204 may indicate a logical ID, resource type, status, description, and also the service provider network 102/104 for the resource 114. Additionally, one or more selectable interface elements are displayed, such as a selectable interface element that can be used to initiate designing a template 122, and also an interface element for designing a schema 134 (e.g., resource type) for a computing resource 114.

In an embodiment, the resource type list 204 displays a list of computing types (e.g., schemas 134) that may, for example, be associated with a user account. As shown, each entry in the list includes various information about a particular computing resource schema 134 such as, for example, a name of the computing resource 114, an indication of the status of the computing schema 134 (for example, indicating whether the schema 134 is currently being created, creation of the schema 134 has completed successfully, creation of the schema 134 failed, and so forth), an indication of the service provider network 102/104 of the computing resource 114, and possibly other information about the schema 134.

In an embodiment, computing resource details include more detailed information about a selected computing resource 114 from the computing resource list 204. For example, a user may provide input selecting one of the computing resources 114 in the list 204 and the interface 200 can display additional detailed information including overview information, a list of the computing resources included in the corresponding computing resource stack, event information associated with the computing resource, information about a corresponding infrastructure schema 134 that was used to define the computing resource, among other related information.

In an example, the interface 200 may include a resource type interface 206 that presents an infrastructure schema 134 for the indicated computing resource 114 and/or service provider network 102/104. As illustrated, a portion of the schema 134 for a message queue may be presented in the schema interface 206 to allow a user 108 to define an infrastructure schema 134 defining a computing resource 114 of a particular type, and in a particular service provider network 102/104. In some examples, the schema 134 may include an indication of the type of the resource 114 (e.g., queue), the service provider network 102/104 in which the resource 114 is to be provisioned, and properties or parameters for the computing resource 114. The resource type interface 206 may present the schema 134 which, in this example, is a JSON schema. The properties may include a "MaximumMessageSize" which allows a user 108 to define the maximum size of messages for their message queue resource 114. As shown, the schema 134 may restrict or control the input of the user by defining that the input must be of a "type" that is an "integer" meaning that input from the user must be an integer for this property (e.g., maximum of 262144 and minimum of 1024). Additionally, the schema 134 may provide annotations, or hints, at the types of input the user 108 is to input into the fields. In this example, the "description" notifies a user 108 that the field is for "The maximum allowed message size" for the message queue resource 114 and/or service 112.

If the user does not provide the correct input that corresponds to the defined "type" of "integer," then the template validator 130 may give an error when the user 108 attempts to create an infrastructure schema 134. In this way, the schemas 134 may be utilized to help users 108 provide appropriate input to define infrastructure templates 122 that will cause the desired resources 114 and/or services 112 to be provisioned in the appropriate service provider network 102/104.

This is simply one example of a schema 134 for a resource type, such as a message queue, but the techniques are equally applicable for any resource type, for any service provider network 102/104, and for any type of schema language. After defining the infrastructure schema 134, the developer may publish the schema 134 defining the computing resource to the registry 132.

Figure 2B:
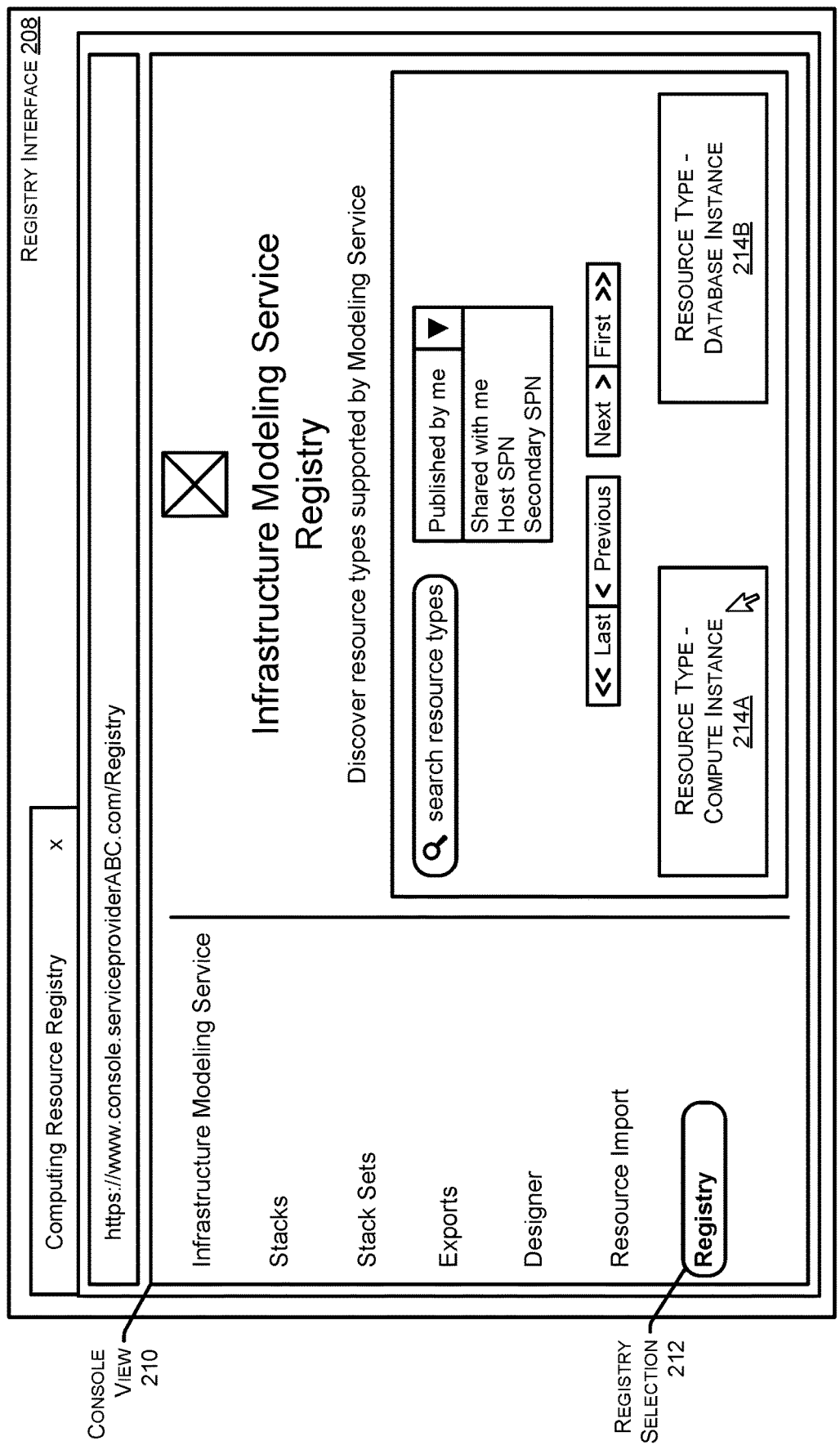

FIG. 2B illustrates an example registry interface 208 through which users who have user accounts with the service provider network 102 may browse schemas 134, or resource types, for creating infrastructure templates 122 to provision resources 114 in service provider networks 102/104. As illustrated, a console view 210 may include selectable options, including the registry selection 212, that allows a user to navigate features of the infrastructure modeling service 120. Upon selecting the register selection 212, the user may be provided with a registry interface 208 for the registry 132. The user may be allowed to search resource types, and restrict the search based on various parameters (e.g., resource types published by the user, shared with the user, shared for the host service provider network 102, shared for secondary user provider network(s) 104, etc.). The user may be able to select a particular field 214 indicating a resource type, such as resource type—compute instance 214A or resource type—database instance 214B.

Figure 2C:
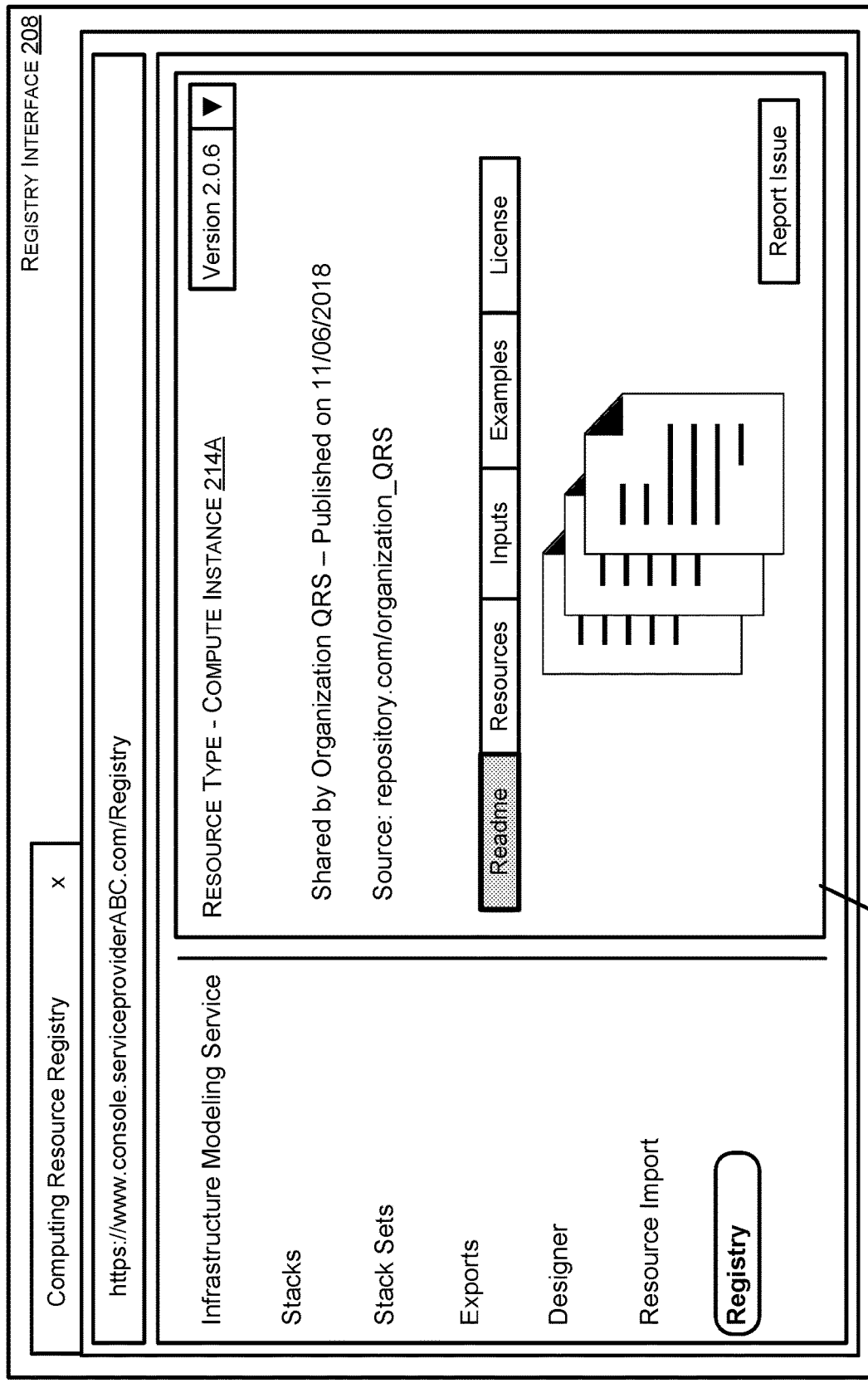

FIG. 2C illustrates an example where a user 108 selects a resource type from the registry 132 to view, such as the resource type—computing instance 214A. The registry interface 208 may then present a GUI including resource type specifications 216 for the resource type 214A. The specification 216 may include various data or metadata for the resource type of the schema 134 stored in the registry 132, such as who is was shared by, a source or location of the resource type 214A, readme information, resources, inputs, examples, license information, etc. In this way, a user 108 may consume the resource type 214, or schema 134, using the registry interface 208. The user 108 may then use this information to create an infrastructure template 122 that is valid according to the schema 134 for the resource type 214.

Figure 3A:
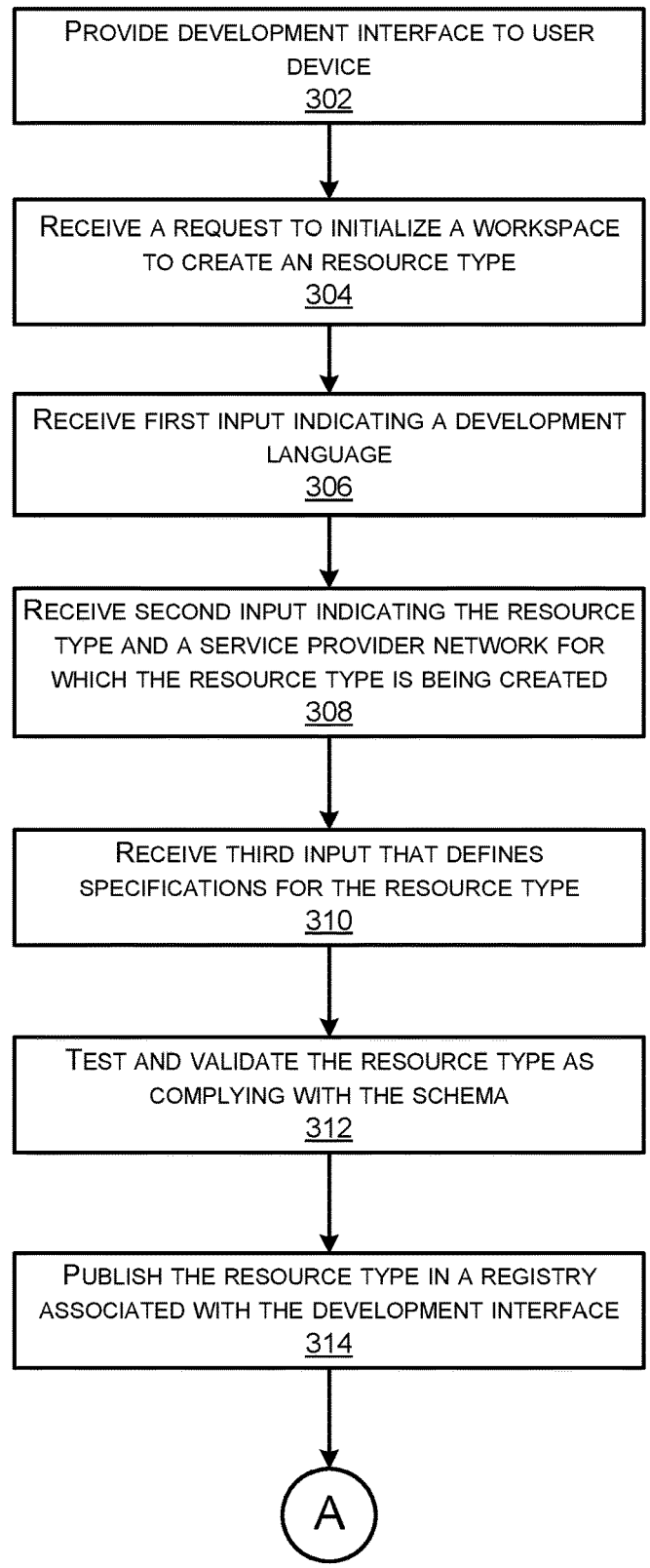
FIGS. 3A and 3B illustrate a flow diagram of an example method for allowing developers to create resources types, and allowing users to define resource templates based on the resources types to provision a computing resource in a service provider network.
Figure 3B:
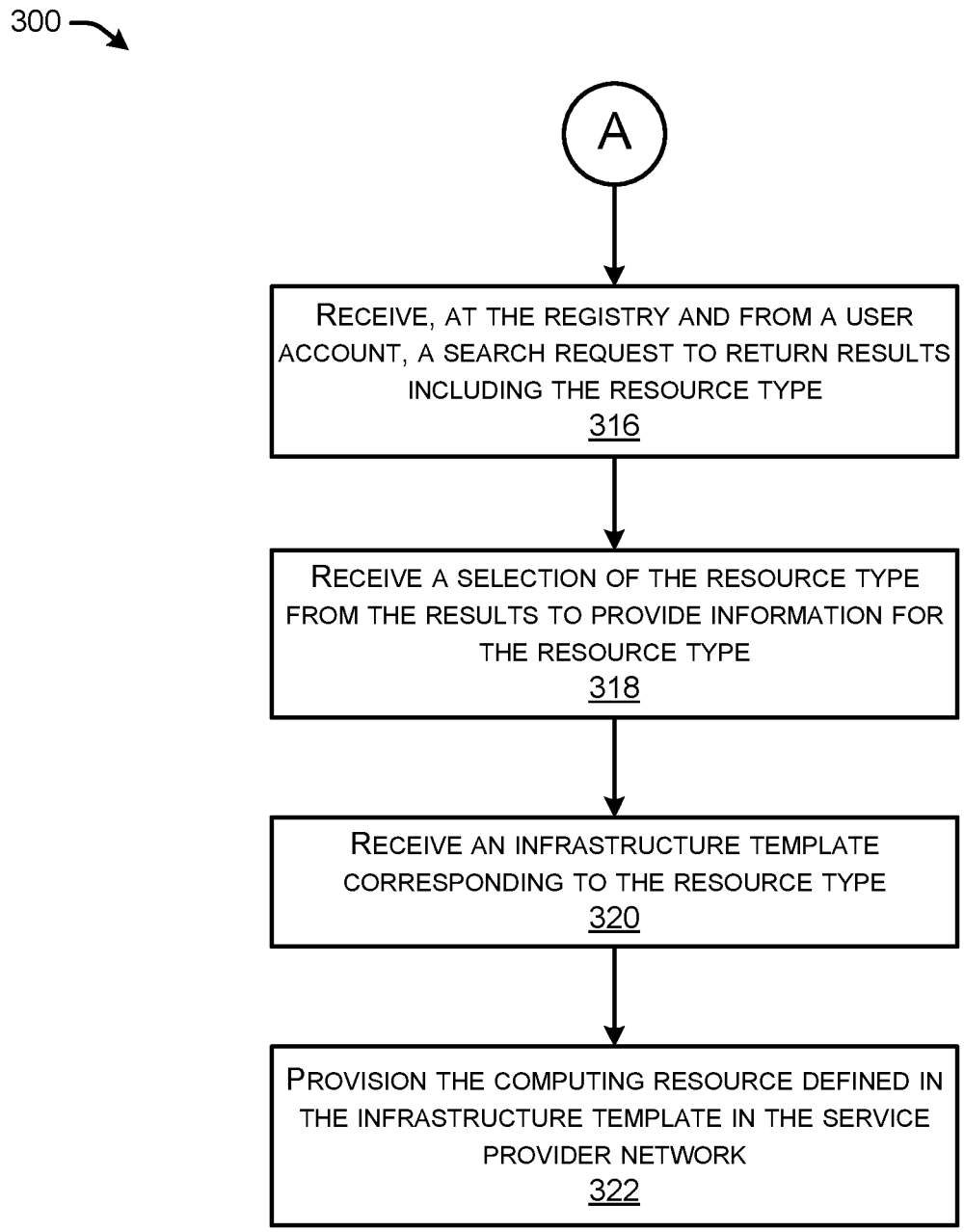

FIGS. 3A and 3B illustrate a flow diagram of an example method 300 for allowing developers to create resources types, and allowing users to define resource templates based on the resources types to provision a computing resource in a service provider network.

At 302, a service provider network 102 may provide a development interface to a user device. In some examples, the development interface 118 may be an API, console, and/or CLI through which a user 108 interacts via a user device 110, such as over network(s) 116 (e.g., Internet, Intranet, etc.). In various examples, the development interface 118 may be a software development kit that is distributed to the user device 110 (e.g., downloaded) via a software distribution model. In such examples, the user 108 may utilize the SDK that is executing, at least partly, on their user device 110 to define the infrastructure schema 134 for a resource 114.

At 304, the service provider network 102 may receive a request to initialize a workspace to create a resource type 214. For instance, the user 108 may select the "create resource type" option in the developer interface 200.

At 306, the service provider network 102 may receive first input indicating a development language. For instance, the user 108 may select, in the schema interface 206, a language with which to design or develop a resource type 214 or schema 134 (e.g., JSON, YAML, XML, etc.).

At 308, the service provider network 102 may receive second input indicating a resource type 214 and a service provider network 102/104 for which the resource type 214 is being created. For instance, the user 108 may select or create a new resource 114 in the resource type list 204, and may also define a service provider network 102/104 in which the resource 114 is to be provisioned.

At 310, the service provider network 102 may receive third input that defines specification for the resource type 214. For instance, the developer may provide, via the development interface 118, parameters or specifications for the resource type 214 that they would like to create.

At 312, the service provider network 102 may test and validate the resource type 214 as complying with the schema 134. For instance, the service provider network 102 may determine whether or not the definition of the resource type 214 complies with a JSON schema or structure.

At 314, the service provider network 102 may publish the resource type 214 in the registry 132 according to a define publication status (e.g., public, private, various flavors of private, etc.).

At 316, the service provider network 102 may receive, at the registry 132 and from a user account, a search request to return results including the resource type 214. For instance, a user 108 may search the registry 132 using the registry interface 208.

At 318, the service provider network 102 may receive a selection, via the registry interface 208, of the resource type 214 from the results to provide information for the resource type 214.

At 320, the service provider network 102 may receive an infrastructure template 122 corresponding to the resource type 214. For instance, the user 108 may have defined an infrastructure template 122.

At 322, the service provider network 102 may utilize the infrastructure template 122 to provision the computing resource 114 in the desired network 102/104 (e.g., calling one or more APIs).

Figure 4:
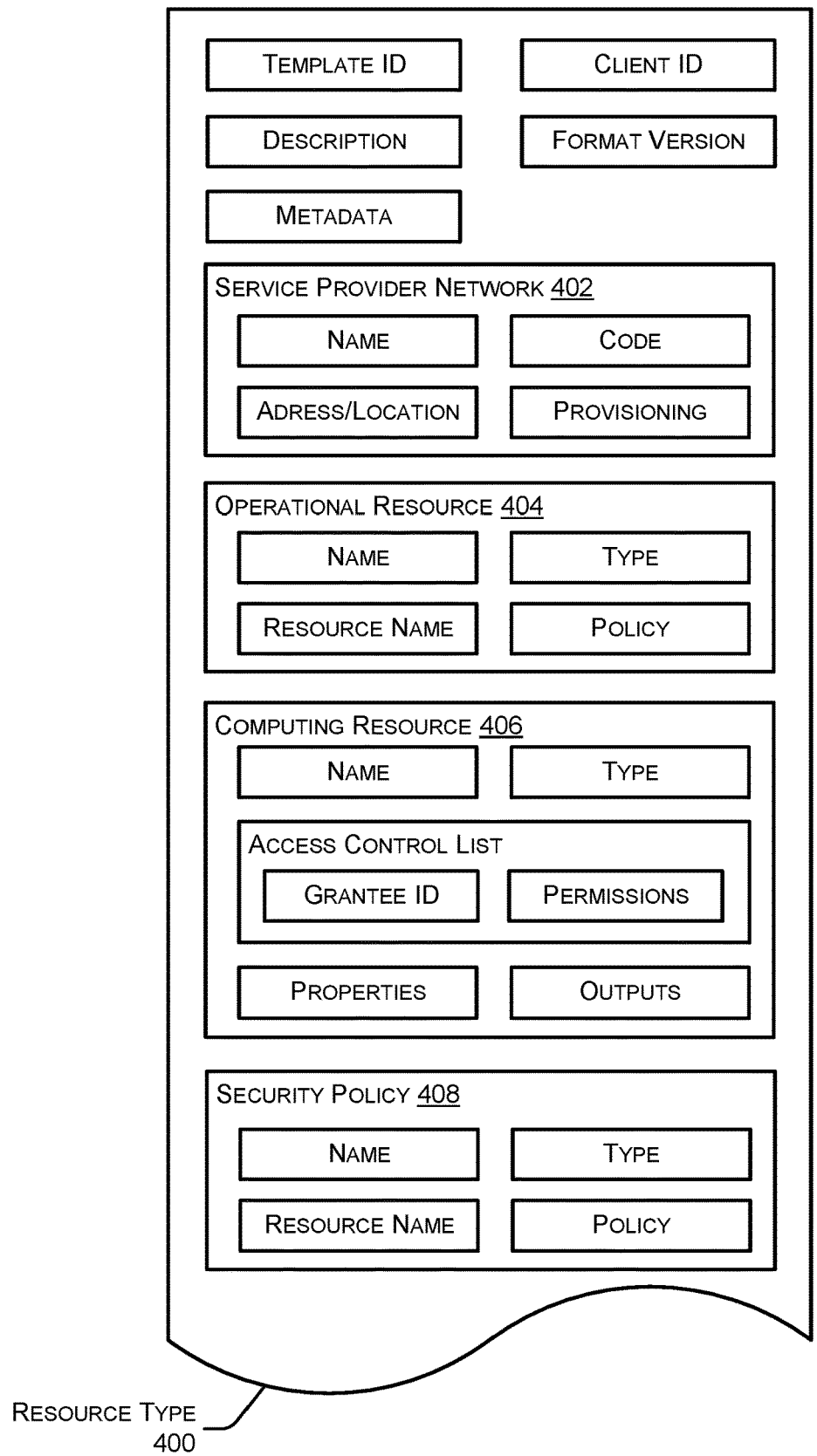
FIG. 4 illustrates an example diagram of a resource type that can be consumed by a user to create an infrastructure template to provision and deploy computing resources.

FIG. 4 illustrates a diagram of an example resource type 400 used to provision and deploy computing resources 114. In some examples, the infrastructure template may be an example of the infrastructure template(s) 122.

The resource type 400 may represent configuration data for provisioning a computing resource 114. A template 122 may have more or less information than the illustrated resource type 400, but the following description provides some examples of resources 114 that can be defined and launched using a resource type 400. A resource type 400 may include header information such as a template identifier, a user identifier for the user (i.e., client) who owns the template, and one or more fields containing descriptive information such as versioning and text describing what the resource type 400 is used for. One or more definitions 402, 404, 406, and 408 may be included in the resource type 400, and each may provide parameters to be included in the configuration of resources created and/or defined from the resource type 400. Non-limiting examples of resource definitions include: a service provider network 402 including a name, an address/location of the service provider network for which the resource type 400 is created, code, and provisioning data; an operational resource definition 404 including a name, a resource type (e.g., logical container; group scaling policy), and an access policy; a computing resource definition 406 including a name for identifying virtual resource instances launched from the definition 406, a resource type (e.g., virtual machine, data store, message queue, etc.), one or more access control lists or other security sub-policies identifying one or more users and the access permissions they are granted, and one or more properties of the corresponding virtual resource instance; and, a security policy definition 408 including a policy name, policy type, the name of the computing resource the security policy attaches to, and the security policy itself or a reference (e.g., file name) thereto.

A provisioning engine 124 as described above may be configured to create and configure virtual resource instances from the definitions defined according to the resource type 400. In one example, the resource allocation system (e.g., infrastructure modeling service 120) may read a computing resource definition 406 for a virtual machine to determine the type and amount of physical and/or virtual resources to allocate for an instance of the virtual machine. This information may be determined from the properties of the definition 406, such as a virtual machine image file or a plurality of parameters identifying the file system, operating system, runtime environment, number and composition of containers, software program(s) to execute, and the like. The properties may also identify how an associated instance should be connected to the virtual network and/or configured as an endpoint connected to an external communication network. In another example, the resource allocation system may read a security policy definition 408 to create a security policy and attach the security policy to the example virtual machine instance.

Figure 5:
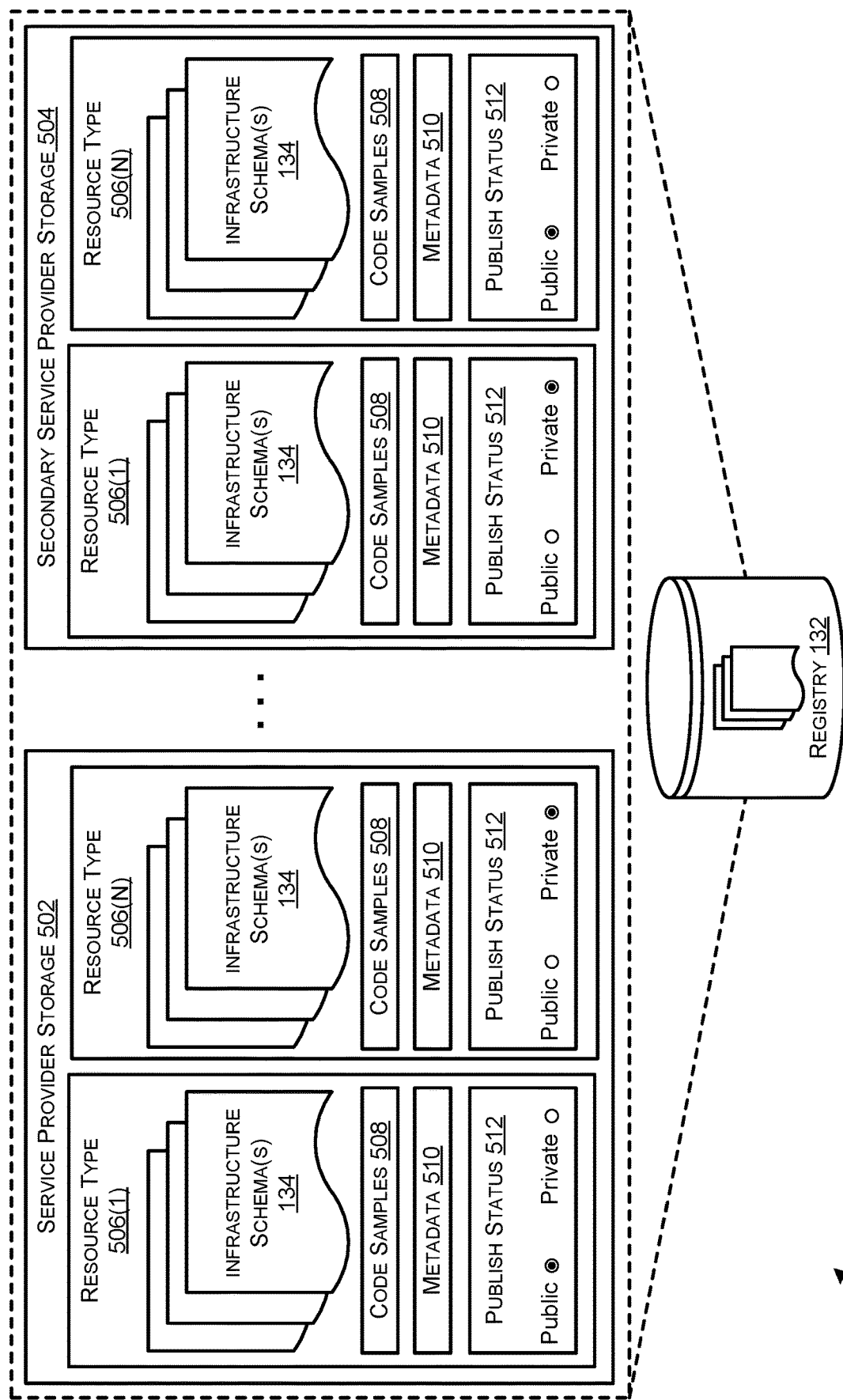
FIG. 5 illustrates an example repository for storing sample infrastructure schemas, or resource types, for multiple service provider networks.

FIG. 5 illustrates a diagram 500 of an example registry 132 for storing sample infrastructure templates, or schemas 132, for multiple service provider networks 102/104.

The registry 132 may be stored in one or more repositories managed by, provided by, or otherwise associated with the service provider network 102. The registry 132 may include different storage locations, such as service provider storage 502 for schemas 134 defined for the service provider network 102, and a secondary service provider storage 504 for schemas defined for secondary service provider network(s) 104. As illustrated, the storage locations 502/504 for the different service provider networks 102/104 may store the schemas 134 based on the resource type 506. For instance, schemas 134 usable to define database resources 114 may be stored together, schemas 134 usable to define compute resources 114 may be stored together, and so forth, for ease in searching, browsing, and locating schemas 134.

Apart from the schemas 134, the registry 132 may further store documentation, code samples 508, and other metadata 510 including version number, dependencies, etc., for that resource type 506. In some examples, there are two modes of the registry 132: public and private. A developer of the schemas 134 may select a publish status 512 as private or public to allow other users to view and use a schema 134 (public status), or hide a schema 134 from other users 108 and/or developers (private status). Generally, users 108 that have accounts with the service provider network(s) 102/104 may access the registry 132 to store and/or obtain schemas 134 to define templates 122 for different service provider networks 102 and 104.

FIGS. 6A, 6B, 7, and 8 illustrate flow diagrams of example methods 600, 700, and 800 that illustrate aspects of the functions performed at least partly by the service provider network 102 as described in FIGS. 1-5. The logical operations described herein with respect to FIGS. 6A, 6B, 7, and 8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6A, 6B, 7, and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 6A:
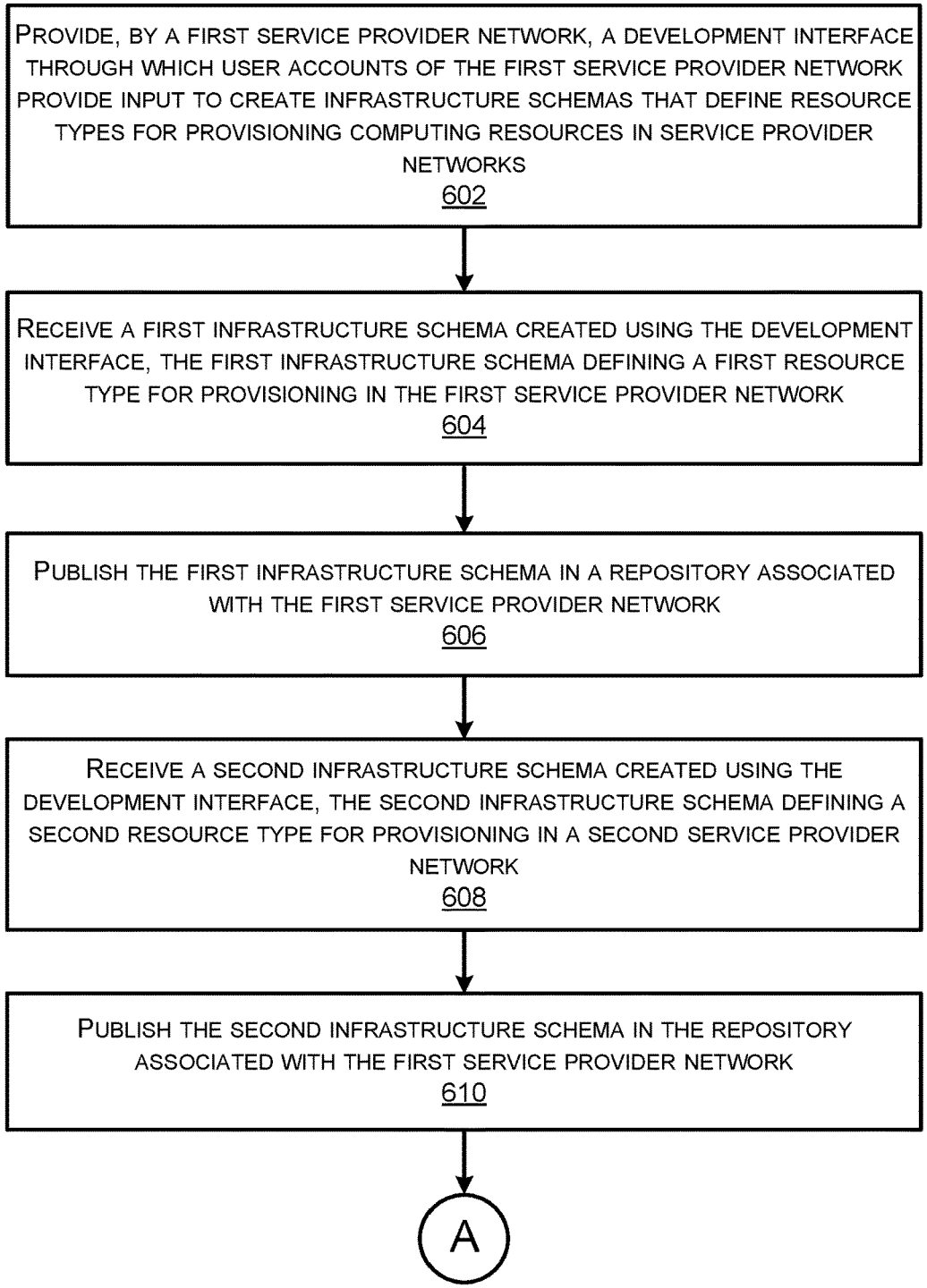
FIGS. 6A and 6B illustrate a flow diagram of an example method for a service provider network to receive infrastructure schemas corresponding to resource types for provisioning computing resources in two service provider networks.
Figure 6B:
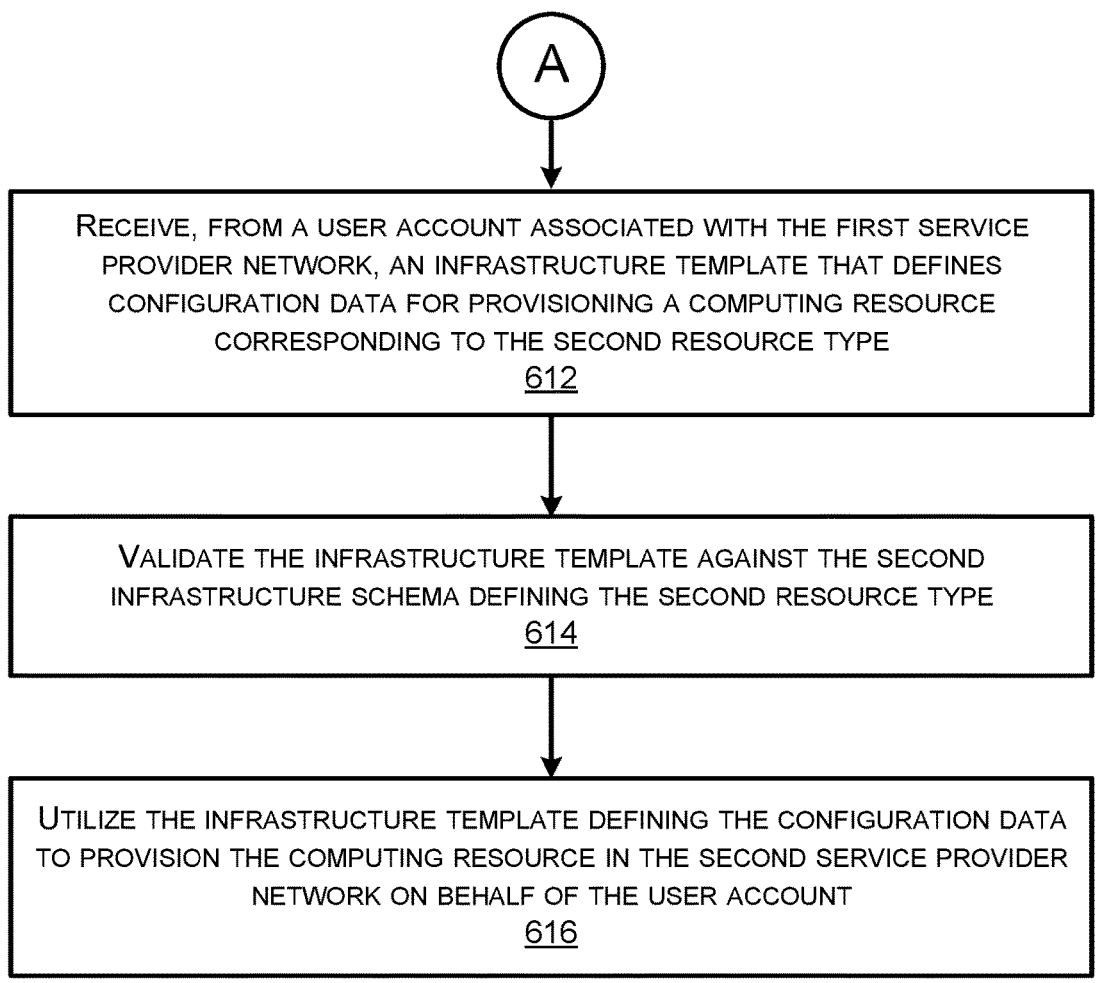

FIGS. 6A and 6B illustrate a flow diagram of an example method 600 for a service provider network 102 to receive infrastructure schemas corresponding to resource types for provisioning computing resources in two service provider networks.

At 602, a first service provider network 102 may provide a development interface through which user accounts of the first service provider network provide input to create infrastructure schemas that define resource types for provisioning computing resources in service provider networks. In some examples, the development interface 118 may be an API, console, and/or CLI through which a user 108 interacts via a user device 110, such as over network(s) 116 (e.g., Internet, Intranet, etc.). In various examples, the development interface 118 may be a software development kit that is distributed to the user device 110 (e.g., downloaded) via a software distribution model. In such examples, the user may utilize the SDK that is executing, at least partly, on their user device 110 to define the infrastructure template 122 for a resource 114.

At 604, the first service provider network 102 may receive a first infrastructure schema created using the development interface, the first infrastructure schema defining a first resource type for provisioning in the first service provider network 102.

At 606, the first service provider network 102 may publish the first infrastructure schema in a repository 132 associated with the first service provider network 102. The first service provider network 102 may publish the schema according to various publication status (e.g., public for all user accounts, private such that certain user accounts, organizations, individual user accounts, etc.).

At 608, the service provider network 102 may receive a second infrastructure schema created using the development interface, the second infrastructure schema defining a second resource type for provisioning in a second service provider network 104.

At 610, the service provider network 102 may publishing the second infrastructure schema in the repository associated with the first service provider network 102. The first service provider network 102 may publish the second infrastructure schema according to various publication status (e.g., public for all user accounts, private such that certain user accounts, organizations, individual user accounts, etc.).

At 612, the service provider network 102 may receive, from a user account associated with the first service provider network, an infrastructure template 122 that defines configuration data for provisioning a computing resource corresponding to the second resource type.

At 614, the service provider network 102 may validate the infrastructure template against the second infrastructure schema defining the second resource type. At 616, the service provider network 102 may utilize the infrastructure template defining the configuration data to provision the computing resource in the second service provider network on behalf of the user account. For instance, the service provider network 102 may provision the computing resource 114 in the service provider network 102, or in a secondary service provider network 104, by calling one or more APIs.

Figure 7:
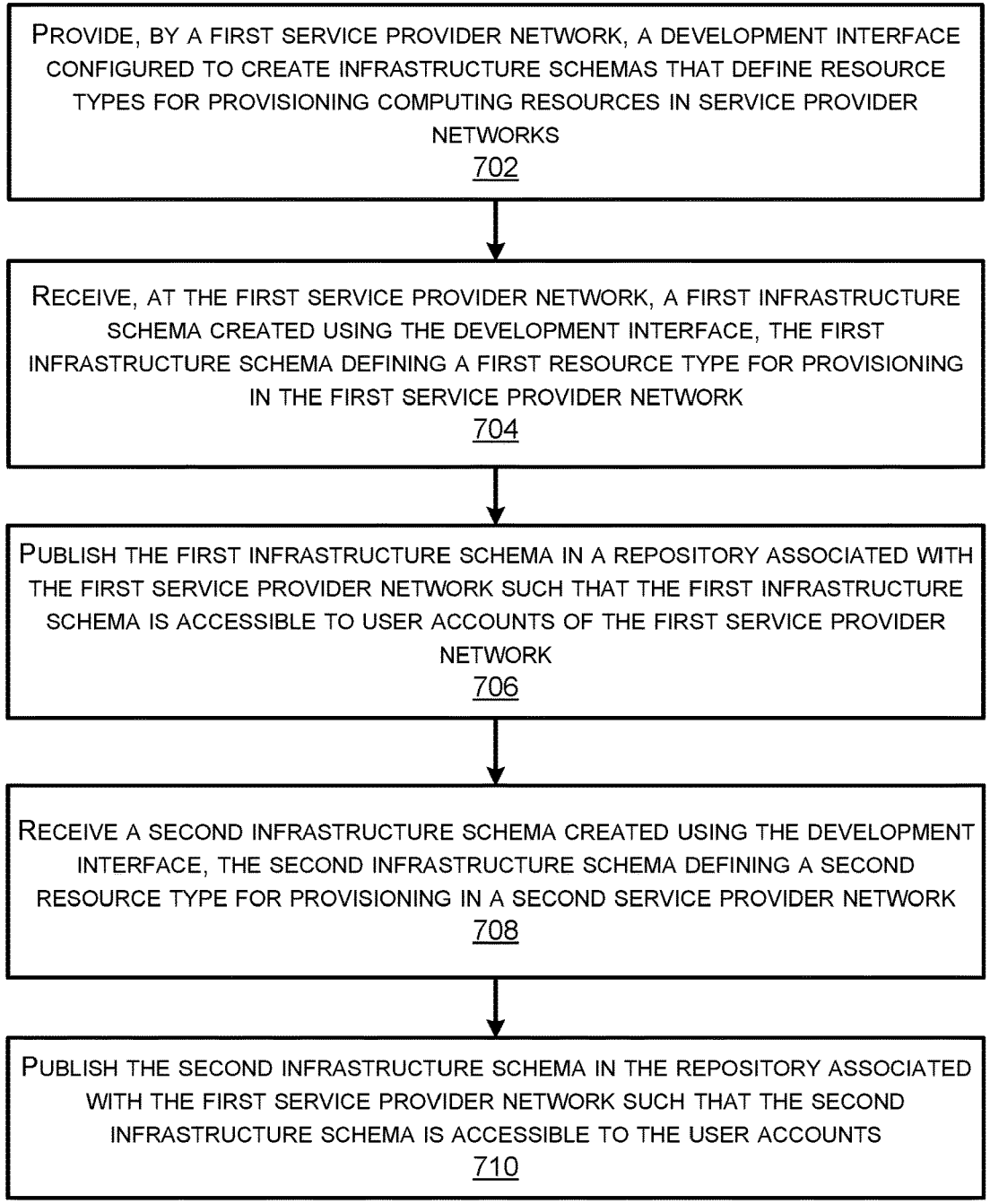
FIG. 7 illustrates a flow diagram of an example method for a first service provider network to publish infrastructure schemas defining computing resource types for multiple service provider networks.

FIG. 7 illustrates a flow diagram of an example method 700 for a first service provider network 102 to publish infrastructure schemas 134 defining computing resource types for multiple service provider networks 102/104.

At 702, the first service provider network 102 may provide a development interface configured to create infrastructure schemas that define resource types for provisioning computing resources in service provider networks. For example, the service provider network 102 may provide a development interface 118 configured to create infrastructure schemas 134 that define resource types for provisioning computing resources 114 in service provider networks 102/104.

At 704, the first service provider network 102 may receive a first infrastructure schema 134 created using the development interface, the first infrastructure schema defining a first resource type for provisioning in the first service provider network 102.

At 706, the first service provider network 102 may publish the first infrastructure schema 134 in a repository 132 associated with the first service provider network 102 such that the first infrastructure schema 134 is accessible to user accounts of the first service provider network.

At 708, the first service provider network 102 may receive a second infrastructure schema 134 created using the development interface, the second infrastructure schema 134 defining a second resource type for provisioning in a second service provider network 104.

At 710, the first service provider network 102 may publish the second infrastructure schema 134 in the repository 132 associated with the first service provider network 102 such that the second infrastructure schema is accessible to the user accounts.

Figure 8:
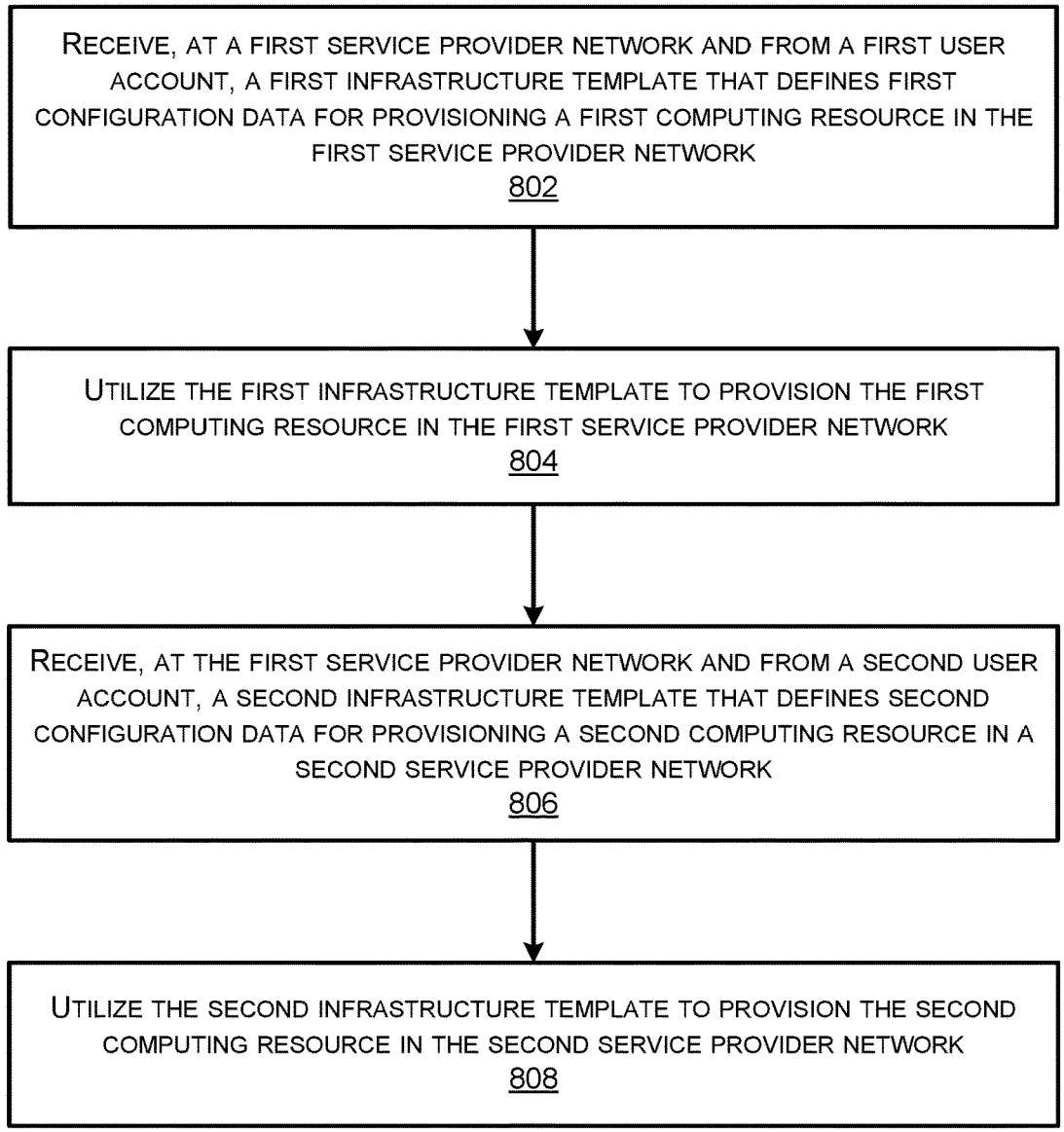
FIG. 8 illustrates a flow diagram of an example method for a service provider network to provision computing resources in multiple service provider networks.

FIG. 8 illustrates a flow diagram of an example method 800 for a service provider network 102 to provision computing resources 114 in multiple service provider networks 102/104.

At 802, a first service provider network 102 may receive, from a first user account, a first infrastructure template 122 that defines first configuration data for provisioning a first computing resource 114 in the first service provider network 102.

At 804, the first service provider network 102 may utilize the first infrastructure template 122 to provision the first computing resource 114 in the first service provider network 102.

At 806, the first service provider network 102 may receive, from a second user account, a second infrastructure template 122 that defines second configuration data for provisioning a second computing resource 114 in a second service provider network 104.

At 808, the first service provider network 102 may utilize the second infrastructure template 122 to provision the second computing resource 114 in the second service provider network 104.

Figure 9:
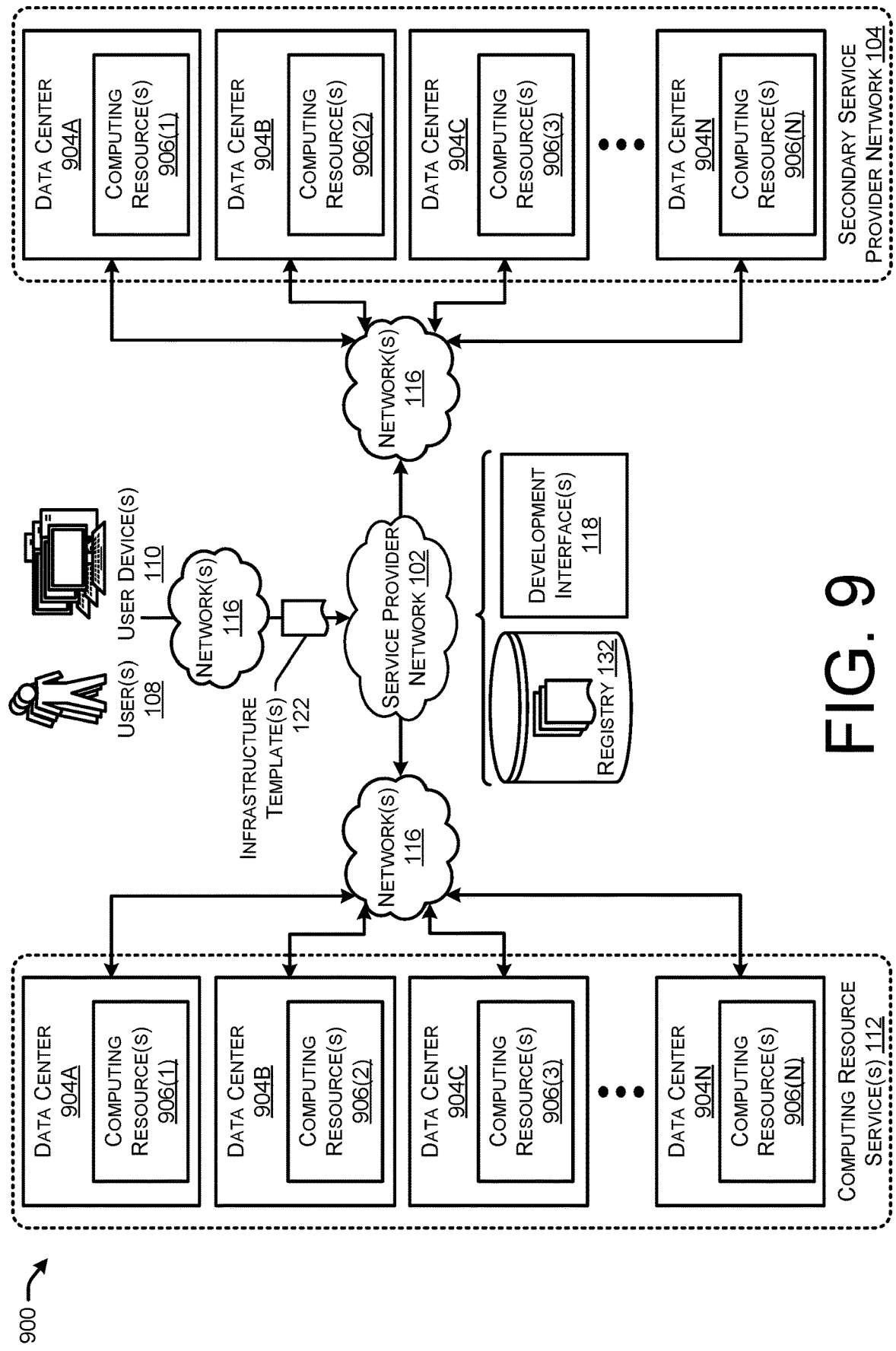
FIG. 9 illustrates a system and network diagram that shows an illustrative operating environment that includes a service provider network that can be configured to implement aspects of the functionality described herein.

FIG. 9 is a system and network diagram that shows an illustrative operating environment 900 that includes a service provider network 102 and/or a secondary service provider network 104 (that may be part of or associated with a cloud-based service network/platform) that can be configured to implement aspects of the functionality described herein.

The service provider networks 102/104 can provide computing resources 906, like VM instances and storage, on a permanent or an as-needed basis. Among other types of functionality, the computing resources 906 provided by the service provider network 102 may be utilized to implement the various services described above. The computing resources provided by the service provider networks 102/104 can include various types of computing resources, such as data processing resources like VM instances, data storage resources, networking resources, data communication resources, application-container/hosting services, network services, and the like.

Each type of computing resource provided by the service provider networks 102/104 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider networks 102/104 can also be configured to provide other types of computing resources not mentioned specifically herein.

The computing resources 906 provided by the service provider networks 102/104 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations. One illustrative embodiment for a data center 904 that can be utilized to implement the technologies disclosed herein will be described below with regard to FIG. 10.

The data centers 904 may be configured in different arrangements depending on the service provider networks 102/104. For example, one or more data centers 904 may be included in or otherwise make-up an availability zone. Further, one or more availability zones may make-up or be included in a region. Thus, the service provider networks 102/104 may comprise one or more availability zones, one or more regions, and so forth. The regions may be based on geographic areas, such as being located within a predetermined geographic perimeter.

The users 108 and/or admins of the service provider networks 102/104 may access the computing resources 906 provided by the data centers 904 of the service provider networks 102/104 over any wired and/or wireless network(s) 116 (utilizing a user device 108 and/or another accessing-user device), which can be a wide area communication network ("WAN"), such as the Internet, an intranet or an Internet service provider ("ISP") network or a combination of such networks. For example, and without limitation, a device operated by a user of the service provider networks 102 may be utilized to access the service provider network 102 by way of the network(s) 116. It should be appreciated that a local-area network ("LAN"), the Internet, or any other networking topology known in the art that connects the data centers 904 to remote clients and other users can be utilized. It should also be appreciated that combinations of such networks can also be utilized.

As illustrated in FIG. 9, the service provider network 102 may be configured to support some or all of the components of the infrastructure modeling service 120. For example, at least some of the computing resources 906 in one or all of the data centers 904 may correspond to the computing resources 114 of the computing resource service(s) 112. In some examples, the service provider network 102 may provide the development interface 118 to the user devices 110 to define one or more infrastructure templates 122. The service provider network 102 may provide, via the development interface(s) 118, one or more infrastructure schema(s) 134 that are stored in the registry 132 to facilitate the creation or defining of the infrastructure templates 122. The service provider network 102 may provision computing resources 906 (e.g., computing resources 114) in data centers 904 of one or both of the computing resource service(s) 112 and/or the secondary service provider network 104. In this way, a user 108 may be enabled to define infrastructure templates 122 via a unified development interface 118 for computing resources 906 for a host service provider network 102, and/or for a secondary service provider network 104.

Figure 10:
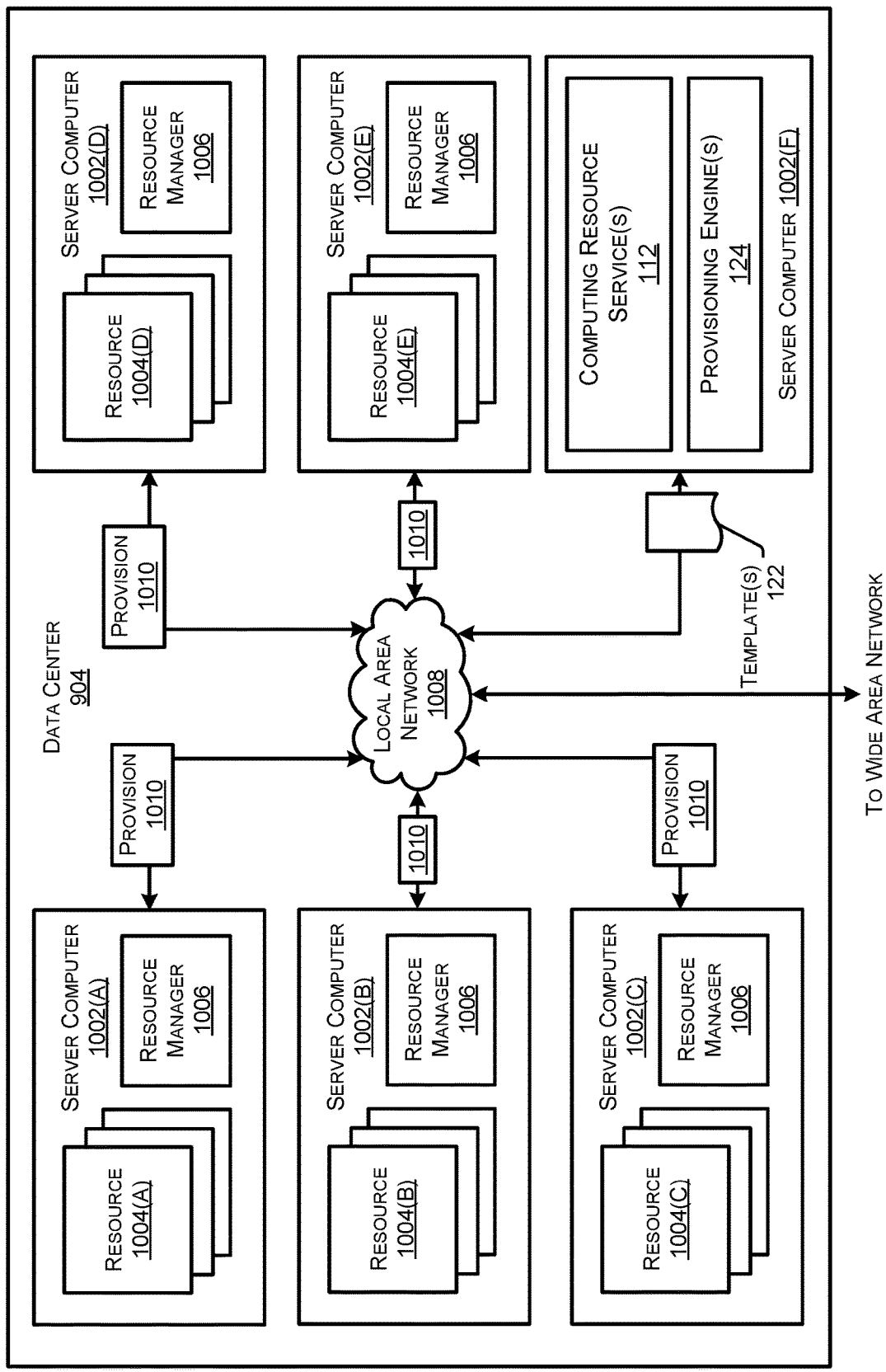
FIG. 10 illustrates a computing system diagram illustrating a configuration for a data center that can be utilized to implement aspects of the technologies disclosed herein.

FIG. 10 is a computing system diagram illustrating a configuration for a data center 904 that can be utilized to implement aspects of the technologies disclosed herein. The example data center 904 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, or correspond to, the computing resources 114 described herein.

The server computers 1002 can be standard tower, rackmount, or blade server computers configured appropriately for providing the computing resources described herein (illustrated in FIG. 10 as the computing resources 1004A-1004E). As mentioned above, the computing resources provided by the service provider network 1002 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances 110, for example, the resource manager 1006 can be a hypervisor or another type of program configured to enable the execution of multiple VM instances on a single server computer 1002. Server computers 1002 in the data center 904 can also be configured to provide network services and other types of services.

In the example data center 904 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1002A-1002F in each data center 904, and, potentially, between computing resources in each of the server computers 1002. It should be appreciated that the configuration of the data center 904 described with reference to FIG. 10 is merely illustrative and that other implementations can be utilized.

As illustrated, one or more server computers 1002(F) may support the computing resource service(s) 112 and/or provisioning engine 124. The computing resource service(s) 112 and/or provisioning engine 124 may utilize template(s) 122 to provision 1010 resources 114/1004 in the server computers 1002 for users 108.

Figure 11:
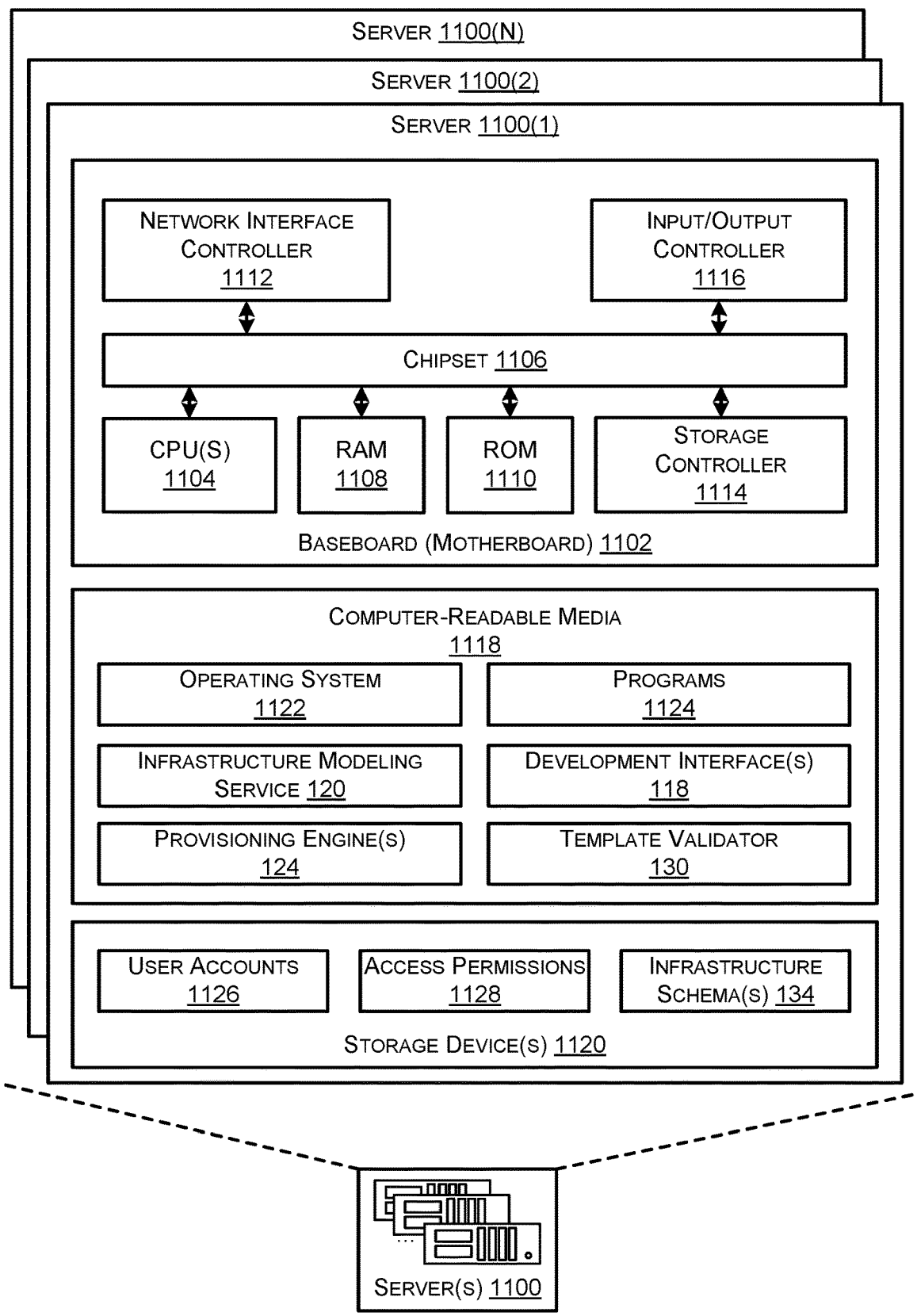
FIG. 11 is a computer architecture diagram showing an illustrative computer hardware architecture for implementing one or more server devices that can be utilized to implement aspects of the various technologies presented herein.

FIG. 11 is a computer architecture diagram showing an illustrative computer hardware architecture for implementing one or more server devices that can be utilized to implement aspects of the various technologies presented herein. The computer architecture shown in FIG. 11 illustrates one or more of a conventional server computer, workstation, desktop computer, laptop, tablet, network appliance, e-reader, smartphone, or other computing device, and can be utilized to execute any of the software components presented herein.

The server(s) 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the server(s) 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the server(s) 1100. The chipset 1106 can further provide an interface to a computer-readable storage medium such as a read-only memory ("ROM") 1110 or non-volatile RAM ("NVRAM") for storing basic routines that help to startup the server(s) 1100 and to transfer information between the various components and devices. The ROM 1110 or NVRAM can also store other software components necessary for the operation of the server(s) 1100 in accordance with the configurations described herein.

The server(s) 1100 can operate in a networked environment using logical connections to remote computing devices and computer systems through a network, such as the network 1008. The chipset 1106 can include functionality for providing network connectivity through a NIC 1112, such as a gigabit Ethernet adapter. The NIC 1112 is capable of connecting the server(s) 1100 to other computing devices over the network 1008 (or 116). It should be appreciated that multiple NICs 1112 can be present in the server(s) 1100, connecting the computer to other types of networks and remote computer systems.

The server(s) 11000 can be connected to one or more computer-readable media 1118 storing software components for the server devices 1100, and one or more mass storage devices 1120 for storing data. The computer-readable media 1118 can store an operating system 1122, programs 1124, and data, which have been described in greater detail herein. The mass storage device 1120 can be connected to the server(s) 1100 through a storage controller 1114 connected to the chipset 1106. The mass storage device 1120 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable media 1118 may store the components described herein as executable, computer-readable instructions. For instance, the components may include the development interface(s) 118, infrastructure modeling service 120, provisioning engine(s) 124, and/or the template validator 130. The components may be stored and/or executed on a single server, or on a system of two or more severs 1100.

The server(s) 1100 can store data on the mass storage device 1120 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the server(s) 1100 can store information to the mass storage device 1120 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server(s) 1100 can further read information from the mass storage device 1120 by detecting the physical states or characteristics of one or more particular locations within the physical storage units.

In addition to the mass storage device 1120 described above, the server(s) 1100 can have access to the computer-readable storage media 1118 to store and retrieve information, such as program modules, data structures, or other data.

It should be appreciated by those skilled in the art that computer-readable storage media is any available media that provides for the non-transitory storage of data and that can be accessed by the server(s) 1100. In some examples, the operations performed by the service provider network 102, and or any components included therein, may be supported by one or more devices similar to server(s) 1100. Stated otherwise, some or all of the operations performed by the service-provider network 102, and or any components included therein, may be performed by one or more computer devices 1100 operating in a cloud-based arrangement. As shown, the storage device 1120 may store user accounts 1126 for the different users of subscribers, and access permissions 1128 that are defined for the different user accounts 1126.

By way of example, and not limitation, computer-readable storage media 1118 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1120 can store an operating system 1122 utilized to control the operation of the server(s) 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1120 can store other system or application programs and data utilized by the server(s) 1100.

In one embodiment, the mass storage device 1120 or other computer-readable storage media 1118 is encoded with computer-executable instructions which, when loaded into the server(s) 1100, transform the computer from a general-purpose computing system into a special-purpose computer capable of implementing the embodiments described herein. These computer-executable instructions transform the server(s) 1100 by specifying how the CPUs 1104 transition between states, as described above. According to one embodiment, the server(s) 1100 has access to computer-readable storage media storing computer-executable instructions which, when executed by the server(s) 1100, perform the various processes described above with regard to FIGS. 1-10. The server(s) 1100 can also include computer-readable storage media having instructions stored thereupon for performing any of the other computer-implemented operations described herein.

The server(s) 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the server(s) 1100 might not include all of the components shown in FIG. 11, can include other components that are not explicitly shown in FIG. 11, or might utilize an architecture completely different than that shown in FIG. 11.

In various examples, the service provider network 102 may be part of or associated with a cloud-based service network that can be configured to implement aspects of the functionality described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
   providing, by a first service provider network, a development interface to create infrastructure schemas that define resource types for provisioning computing resources in service provider networks, wherein individual ones of the infrastructure schemas are specific to different service provider networks;
   receiving, through the development interface, parameters relating to a first infrastructure schema defining a first resource type to be created for the first service provider network;
   creating the first infrastructure schema defined for the first service provider network using the development interface based at least in part on the parameters, the first infrastructure schema defining the first resource type for provisioning in the first service provider network;
   publishing the first infrastructure schema in a repository associated with the first service provider network;
   receiving a second infrastructure schema defined for the second service provider network and created using the development interface, the second infrastructure schema defining a second resource type for provisioning in a second service provider network;
   publishing the second infrastructure schema in the repository associated with the first service provider network;
   receiving, from a user account associated with the first service provider network, an infrastructure template that defines configuration data for provisioning a computing resource corresponding to the second resource type;
   validating the infrastructure template against the second infrastructure schema defining the second resource type; and
   utilizing the infrastructure template defining the configuration data to provision the computing resource in the second service provider network on behalf of the user account.

2. The computer-implemented method of claim 1, further comprising:
   receiving an indication that the second infrastructure schema is to be published in the repository according to a public publication status, wherein the public publication status allows user accounts associated with the first service provider network to access the second infrastructure schema.

3. The computer-implemented method of claim 1, wherein the infrastructure template comprises a first infrastructure template that defines first configuration data for provisioning a first computing resource, further comprising:
   receiving a second infrastructure template that defines second configuration data for provisioning a second computing resource corresponding to the first resource type;
   validating the second infrastructure template against the first infrastructure schema defining the first resource type; and
   utilizing the second infrastructure template defining the second configuration data to provision the second computing resource in the first service provider network.

4. The computer-implemented method of claim 1, wherein utilizing the infrastructure template defining the configuration data to provision the computing resource in the second service provider network comprises calling, from the first service provider network, one or more application programming interfaces (APIs) associated with provisioning the computing resource in the second service provider network.

5. A computer-implemented method comprising:
   providing, by a first service provider network, a development interface configured to create infrastructure schemas that define resource types for provisioning computing resources in service provider networks, wherein individual ones of the infrastructure schemas are specific to different service provider networks;
   receiving, through the development interface, input relating to a first infrastructure schema defining a first resource type to be created for the first service provider network;
   creating, at the first service provider network, the first infrastructure schema specific to the first service provider network using the development interface based at least in part on the input, the first infrastructure schema defining the first resource type for provisioning in the first service provider network;
   publishing the first infrastructure schema in a repository associated with the first service provider network such that the first infrastructure schema is accessible to user accounts of the first service provider network;
   receiving a second infrastructure schema specific to the second service provider network created using the development interface, the second infrastructure schema defining a second resource type for provisioning in a second service provider network; and
   publishing the second infrastructure schema in the repository associated with the first service provider network such that the second infrastructure schema is accessible to the user accounts.

6. The computer-implemented method of claim 5, further comprising:
   receiving, from a user account, an infrastructure template that defines configuration data for provisioning a computing resource corresponding to the first resource type;
   validating the infrastructure template against the first infrastructure schema defining the first resource type; and
   utilizing the infrastructure template defining the configuration data to provision the computing resource in the first service provider network on behalf of the user account.

7. The computer-implemented method of claim 5, further comprising:
receiving, from a user account, an infrastructure template that defines configuration data for provisioning a computing resource corresponding to the second resource type;
validating the infrastructure template against the second infrastructure schema defining the second resource type; and
utilizing the infrastructure template defining the configuration data to provision the computing resource in the second service provider network on behalf of the user account.

8. The computer-implemented method of claim 7, wherein utilizing the infrastructure template to provision the computing resource in the second service provider network comprises calling, from the first service provider network, one or more application programming interfaces (APIs) associated with provisioning the computing resource in the second service provider network.

9. The computer-implemented method of claim 7, wherein utilizing the infrastructure template to provision the computing resource in the second service provider network comprises at least one of:
sending the infrastructure template to a provider device associated with the second service provider network; or
sending computer-executable instructions corresponding to the infrastructure template to the provider device.

10. The computer-implemented method of claim 7, further comprising validating the infrastructure template against the second infrastructure schema defining the second resource type.

11. The computer-implemented method of claim 5, further comprising:
receiving an indication that the second infrastructure schema is to be published in the repository according to a restricted publication status such that access to the second infrastructure schema is restricted to a group of the user accounts indicated by the restricted publication status.

12. The computer-implemented method of claim 5, further comprising:
receiving a portion of an example infrastructure template corresponding to the second infrastructure schema, the example infrastructure template defining example configuration data for provisioning a computing resource corresponding to the second resource type; and
publishing the portion of the example infrastructure template in the repository such that the portion of the example infrastructure template is associated with the second infrastructure schema.

13. The computer-implemented method of claim 5, wherein the development interface is configured to create infrastructure schemas according to at least one of:
a JSON Schema;
a YAML shcema;
an XML schema; or
a GraphQL Schema.

14. A system comprising:
one or more processors; and
one or more computer-readable media storing computer-executable instructions that, when executed by the one or more processors, cause the one or more processors to:
provide, by a first service provider network, a development interface configured to create infrastructure schemas that define resource types for provisioning computing resources in service provider networks, wherein individual ones of the infrastructure schemas are specific to different service provider networks;
receive, through the development interface, parameters relating to a first infrastructure schema defining a first resource type to be created for the first service provider network;
generate, at a first service provider network, the first infrastructure schema specific to the first service provider network using the development interface based at least in part on the parameters, the first infrastructure schema defining the first resource type corresponding to a first computing resource;
receive, at the first service provider network and from a first user account, a first infrastructure template that defines first configuration data for provisioning the first computing resource in the first service provider network;
utilize the first infrastructure template to provision the first computing resource in the first service provider network;
receive, at the first service provider network, a second infrastructure schema specific to a second service provider network, the second infrastructure schema defining a second resource type corresponding to a second computing resource;
receive, at the first service provider network and from a second user account, a second infrastructure template that defines second configuration data for provisioning the second computing resource in the second service provider network; and
utilize the second infrastructure template to provision the second computing resource in the second service provider network.

15. The system of claim 14, comprising further instructions that, when executed by the one or more processors, cause the one or more processors to:
publish the first infrastructure schema in a repository associated with the first service provider network such that the first infrastructure schema is accessible to user accounts of the first service provider network; and
validate the first infrastructure template against the first infrastructure schema defining the first resource type.

16. The system of claim 15, comprising further instructions that, when executed by the one or more processors, cause the one or more processors to:
publish the second infrastructure schema in the repository such that the second infrastructure schema is accessible; and
validate the second infrastructure template against the second infrastructure schema defining the second resource type.

17. The system of claim 15, comprising further instructions that, when executed by the one or more processors, cause the one or more processors to:
receive an indication that the first infrastructure schema is to be published in the repository according to a restricted publication status such that access to the first infrastructure schema is restricted to a group of the user accounts indicated by the restricted publication status.

18. The system of claim 15, comprising further instructions that, when executed by the one or more processors, cause the one or more processors to:
receive a portion of an example infrastructure template corresponding to the first infrastructure schema, the example infrastructure template defining example configuration data for provisioning the first computing resource; and publishing the portion of the example infrastructure template in the repository such that the portion of the example infrastructure template is associated with the first infrastructure schema.

19. The system of claim 14, wherein utilizing the second infrastructure template to provision the second computing resource in the second service provider network comprises calling, from the first service provider network, one or more application programming interfaces (APIs) associated with provisioning the second computing resource in the second service provider network.

20. The system of claim 14, comprising further instructions that, when executed by the one or more processors, cause the one or more processors to:

validate at least one of the first infrastructure template or the second infrastructure template as complying with a schema for creating infrastructure templates.

* * * * *